(12) United States Patent
Tarascon et al.

(10) Patent No.: US 9,590,245 B2
(45) Date of Patent: *Mar. 7, 2017

(54) METHOD FOR PRODUCING INORGANIC COMPOUNDS

(75) Inventors: Jean-Marie Tarascon, Mennecy (FR); Nadir Recham, Amiens (FR); Michel Armand, Paris (FR)

(73) Assignees: Centre National De La Recherche Scientifique, Paris (FR); Universite De Picardie Jules Verne, Amiens (FR)

( * ) Notice: Subject to any disclaimer, the term of this patent is extended or adjusted under 35 U.S.C. 154(b) by 1270 days.

This patent is subject to a terminal disclaimer.

(21) Appl. No.: 13/124,725

(22) PCT Filed: Oct. 23, 2009

(86) PCT No.: PCT/FR2009/052038
§ 371 (c)(1),
(2), (4) Date: Sep. 27, 2011

(87) PCT Pub. No.: WO2010/046608
PCT Pub. Date: Apr. 29, 2010

(65) Prior Publication Data
US 2012/0007020 A1  Jan. 12, 2012

(30) Foreign Application Priority Data

Oct. 23, 2008  (FR) ..................... 08 05875
May 28, 2009  (FR) ..................... 09 53529
Jul. 27, 2009  (FR) ..................... 09 55233

(51) Int. Cl.
| H01M 4/04 | (2006.01) |
| C01B 25/455 | (2006.01) |
| C01B 17/45 | (2006.01) |
| C01B 25/45 | (2006.01) |
| H01M 4/58 | (2010.01) |
| C01B 25/26 | (2006.01) |
| C01B 25/37 | (2006.01) |
| C01B 33/20 | (2006.01) |
| C01G 1/10 | (2006.01) |
| C01G 49/00 | (2006.01) |
| C01G 51/00 | (2006.01) |
| C01G 53/00 | (2006.01) |
| H01M 10/052 | (2010.01) |

(52) U.S. Cl.
CPC .......... *H01M 4/5825* (2013.01); *C01B 25/26* (2013.01); *C01B 25/37* (2013.01); *C01B 25/45* (2013.01); *C01B 25/455* (2013.01); *C01B 33/20* (2013.01); *C01G 1/10* (2013.01); *C01G 49/009* (2013.01); *C01G 51/006* (2013.01); *C01G 53/006* (2013.01); *H01M 4/582* (2013.01); *C01P 2002/54* (2013.01); *C01P 2002/72* (2013.01); *C01P 2002/77* (2013.01); *C01P 2002/88* (2013.01); *C01P 2004/04* (2013.01); *C01P 2006/40* (2013.01); *H01M 10/052* (2013.01); *Y10T 428/2982* (2015.01)

(58) Field of Classification Search
None
See application file for complete search history.

(56) References Cited

U.S. PATENT DOCUMENTS

2005/0163699 A1  7/2005  Barker et al.
2007/0117019 A1  5/2007  Armand et al.

FOREIGN PATENT DOCUMENTS

| DE | 102006011754 | 9/2007 | |
| DE | 102006011754 A1 * | 9/2007 | |
| DE | EP 2128092 A1 * | 12/2009 | .............. B01J 21/16 |
| JP | 2004035303 | 2/2004 | |
| WO | 02/27824 | 4/2002 | |

OTHER PUBLICATIONS

Search Report dated Oct. 23, 2009.
Ionothermal Systhesis of Li-Based Fluorophosphates Electrodes. Synthesis, crystal structure and lithium ion conductivity of LiMgFS04.

* cited by examiner

*Primary Examiner* — Tanisha Diggs
(74) *Attorney, Agent, or Firm* — Sofer & Haroun, LLP

(57) ABSTRACT

The present arrangement provides compounds (I) $A_aM_m(YO4)_yZ_z(I)$ that are obtained from precursors of the constituent elements by a method having steps that can include dispersion of the precursors in a liquid support having one or more ionic liquids made up of a cation and an anion the electric charges of which balance out to give a suspension of the precursors in the liquid. The suspension is heated to a temperature of 25 to 380° C. and the ionic liquid and the inorganic oxide of formula (I) are separated from the reaction of the precursors.

19 Claims, 18 Drawing Sheets

E (keV)

METHOD FOR PRODUCING INORGANIC COMPOUNDS

RELATED APPLICATIONS

This application is a National Phase application of PCT/FR2009/052038, filed on Oct. 23, 2009, which in turn claims the benefit of priority from French Patent Application Nos. 08 05875, filed Oct. 23, 2008; 09 53529, filed on May 28, 2009; and 09 055233, filed on Jul. 27, 2009, the entirety of which are incorporated herein by reference.

The present invention relates to a novel process for producing inorganic compounds in powder form in an ionic liquid medium at low temperature.

PRIOR ART

Materials in powder form, whether they are mineral, organic or organometallic, are of great use, especially as ceramics used as such or intended for sintering, for magnetic materials for data storage, for pigments and luminescent materials of display systems, or for use as electrode components, in particular lithium batteries.

These materials are generally prepared according to ceramic methods or solvothermal methods.

According to the ceramic methods, the precursors of the final product are treated at a temperature that allows the atoms, ions or covalent species ($SO_4^{2-}$, $PO_4^{3-}$, etc.) to diffuse, and that allows the volatile products to be removed.

The high temperatures used also bring about the pyrolysis of organic species that have served as sources of the corresponding elements (alkoxides) or as gelling agents to avoid the growth of grains (sol-gel method), in particular in methods placing a polyacid (tartaric acid, citric acid, etc.) in contact with a polyalcohol. Powders are thus formed, under an oxidative, neutral or reductive atmosphere. It is very rare to be able to perform reactions of this type at temperatures below 450° C., below which the precursors react incompletely and/or are poorly crystallized. At a higher temperature, the problem of volatilization of the alkaline elements (Li, Na, K) in the form of oxide or fluoride arises, which modifies the expected stoichiometry. These ceramic methods are energetically expensive. Another drawback of ceramic methods is the polydispersity of the powders obtained.

Given the drawbacks of ceramic methods, it is preferred to use solvothermal methods, in particular hydrothermal methods, which are precipitation methods in liquid medium, at ordinary pressure or in an autoclave. Precipitation methods in liquid medium are energetically economical and, if the nucleation-growth phenomena are controlled, they give much narrower size distributions. However, for these solvothermal methods, it is necessary to have available soluble precursors of the elements that will be included in the composition of the final product. Furthermore, these solvothermal methods generate reaction by-products that need to be reprocessed. These two factors give rise to a significant production surcharge.

Most of the precipitation reactions require variations of the degree of solubility of the reagents as a function of the temperature or of the pH. Many metal-based compounds are obtained by introducing their precursors into a reaction support liquid, and then by adding basic compounds and leaving them to mature (Oswald maturation), the process being accelerated by raising the temperature. Raising the temperature also makes it possible to desolvate solvantoscopic phases, and to perform polycondensation reactions of the type:

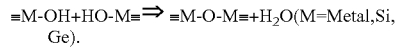
≡M-OH+HO-M≡ ⇒ ≡M-O-M≡+$H_2O$(M=Metal,Si, Ge).

The drawback of this process is the rapid, or even immediate, formation of precipitates of insoluble salts at basic pH values, or of hydroxides of the metals concerned, without control of the nucleation step. Another drawback is the possibility of rapid oxidation of the compounds or of the metal hydroxides by atmospheric oxygen, whereas the corresponding soluble salts are stable with respect to air in acidic or neutral medium. This problem is of particular concern for iron[II], nickel[II], cobalt[II], titanium[II/III], cerium[III] and terbium[III] compounds. This results in variations of the final stoichiometry, the color and the magnetic properties, and also, for electrode materials, a lower bulk capacitance and/or a release of metal ions into the electrolyte. These phenomena are all detrimental to reproducible syntheses and make it necessary to work under an inert atmosphere especially involving total degassing of the solvents. Furthermore, for these syntheses in liquid medium, the bases added are often expensive since they must satisfy criteria of purity of the final product while at the same time avoiding any contamination with foreign cations.

The hydrothermal synthesis of lithium iron phosphate $LiFePO_4$ is an important example of solvothermal synthesis. It is performed according to the following reaction scheme:

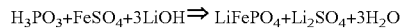
$H_3PO_3+FeSO_4+3LiOH \Rightarrow LiFePO_4+Li_2SO_4+3H_2O$

This synthesis requires three equivalents of lithium hydroxide (LiOH), which is an expensive compound. It is thus necessary to recycle a dilute solution that cannot be released as such as effluent, and to reconvert the products it contains into pure LiOH, which is expensive in terms of energy and reagents. Replacing some of the LiOH with NaOH or KOH has been envisioned, but it leads to contamination of the $LiFePO_4$ phase with sodium or potassium ions, respectively. Furthermore, $Fe(OH)_2$ precipitated in basic medium is extremely sensitive to oxidation with atmospheric oxygen and the result of this is contamination of the final product $LiFePO_4$ with trivalent iron.

Another drawback of solvothermal methods is the limited acid-base or redox stability range of the solvents used. Water, in particular, is limited to a pH region of 14 and to a redox window of 1.3 V at 25° C., which reduces with temperature. Organic solvents have similar drawbacks since their solubilizing properties are acquired only by means of the presence of polar groups [OH, $CONH_2$, CON(H)R], and thus by the presence of labile hydrogen, whose acid-base and redox limits are similar to those of water.

Ionic liquids (IL) are salts for which, by definition, the melting point is ≤100° C. To obtain low melting points ($T_F$), which clearly demark themselves from those of mineral derivatives (e.g.: NaCl, $T_F$=801° C.), use is made of organic cations and anions. The positive charges are generally borne by "ium" cations, for instance ammonium, phosphonium, sulfonium, pyridinium and imidazolium cations. The negative charges are borne by anions with delocalized charge, such as $BF_4^-$, $PF_6^-$, $CF_3SO_3^-$, $[(CF_3SO_2)_2N]^-$, These compounds are stable at high is temperatures (≥300° C.), they have no vapor pressure up to this temperature and they have a large redox stability range, of the order of 3 to 4 V. They are good solvents for many organic compounds in the form of discrete molecules or polymers. Metal salts show appreciable solubility in ionic liquids when they have very low reticular energies, for example the salts of the abovementioned anions $BF_4^-$, $PF_6^-$, $CF_3SO_3^-$, $[(CF_3SO_2)_2N]^-$, in particular the lithium salts, which are of interest for electrochemistry, for batteries or supercapacitors. Said salts are, however, of no value for any chemical process for the preparation of powders due to their high cost and the difficulty in purifying them, due to their very high solubility in all polar solvents and their highly hygroscopic nature. On the other hand, the salts commonly used in preparative chemistry, such as chlorides and a fortiori anion salts whose charge is ≥2, for instance $SO_4^{2-}$, $PO_4^{3-}$, $CO_3^{2-}$, $C_2O_4^{2-}$, show negligible solubility in ionic liquids. Ionic liquids have recently been used as solvent and matrix for the synthesis of mesoporous materials with organic/inorganic components such as zeolites and MOFs (metal organic frameworks), (Parham E. R. et al., Acc. Chem. Res., 2007, 40(10), 1005-1013; Lin Z. et al., Dalton Trans., 2008, 3989-3994).

DE-10 2006 011754 describes the use of an ionic liquid as a liquid support for the synthesis of conductive or semiconductive oxides, more particularly oxides of Sn, In, Zn, or Bi, said oxides being optionally doped. The process consists in introducing the precursors into a liquid phase containing an ionic liquid and a cosolvent, in removing the cosolvent by heating, and then in treating the dispersion with microwaves, under vacuum, to obtain the particles of crystalline oxide. However, in this process, the precursors are placed in contact with the cosolvent, which is a liquid in which they are soluble and/or miscible. The precursors then react with each other immediately to form the desired oxide and the rate of reaction does not allow control of the growth of the grains.

THE PRESENT INVENTION

The aim of the present invention is to overcome the drawbacks of the prior art processes for the preparation of powders by proposing a process for preparing a complex inorganic oxide, which is economical in terms of energy and starting materials and which makes it possible to obtain homogeneous particles while at the same time avoiding the phenomena of oxidation of the air-sensitive reagents.

This aim is achieved by the process that is the subject of the present invention. Specifically, it has been found, surprisingly, that complex oxides or polyanionic compounds may be prepared in a liquid support comprising an ionic liquid, from precursors that have very little or no solubility in said liquid support, by reaction of said precursors at low temperature (temperature range in the region of 300° C. in which most of the ionic liquids are thermally stable), i.e. at temperatures markedly below the temperatures used by conventional ceramic methods, to obtain powders of controlled granulometry, in particular nanometric sizes and whose separation from the reaction medium is particularly easy, as is the recycling of the effluents and of the supportionic liquid of the reaction. In addition, said process makes it possible to use hydrated starting materials, which are considerably less expensive than anhydrous products and which are easy to handle, even for precursors whose ex situ dehydration induces autoxidation phenomena, in particular for iron salts. Moreover, the process of the invention, which uses an ionic liquid, makes it possible electrochemically to grow, at temperatures below 200° C., certain oxides, oxyfluorides, polyanionic compounds and compounds of transition elements such as $Fe^{3+}$ or $Mn^{3+}$ that are capable of being reduced.

One subject of the present invention is a process for preparing an inorganic compound of formula (I) $A_aM_m(YO_4)_yZ_z$ (I) in which:

A represents at least one element chosen from alkali metals, alkaline-earth metals, a dopant element and a space;

M represents $(T_{1-t}T'_t)$, T representing one or more transition metals and T' representing at least one element chosen from Mg, Ca, Al and rare-earths, 0≤t<1;

Y represents at least one element chosen from S, Se, P, As, Si, Ge and Al;

Z represents at least one element chosen from F, O and OH;

a, m, y and z are stoichiometric coefficients and are real, zero or positive numbers, with the following conditions:
   a, m, t, y and z are such that the electrical neutrality of the inorganic oxide of formula (I) is respected,
   a≥0; m>0; y>0
   z≥0;

starting with precursors of the constituent elements of the inorganic oxide of formula (I), said process being characterized in that it comprises the following steps:

i) dispersion of said precursors in a support liquid comprising one or more ionic liquids formed from a cation and an anion whose electrical charges equilibrate, to obtain a suspension of said precursors in said liquid,
   ii) heating of said suspension to a temperature from 25 to 380° C.,
   iii) separation of said ionic liquid and of the inorganic oxide of formula (I) derived from the reaction between said precursors.

During step i), it is possible to use precursors each containing only one of the elements found in the target inorganic oxide of formula (I). It is also possible to use precursors containing at least two of the elements found in the inorganic oxide of formula (I).

The precursors of an alkali metal or alkaline-earth metal A may be chosen from the salts of thermally labile anions, such as carbonates, hydrogen carbonates, hydroxides, peroxides, nitrates; the salts of volatile organic acids such as acetates and formates; the salts of acids that can decompose on heating such as oxalates, malonates and citrates. Among such precursors, mention may be made in particular, for example, of $Li_2CO_3$, $LiHCO_3$, $LiOH$, $Li_2O_2$, $LiNO_3$, $LiCH_3CO_2$, $LiCHO_2$, $Li_2C_2O_4$, $Li_3C_6H_5O_7$, $Na_2CO_3$, $NaOH$, $Na_2O_2$, $NaNO_3$, $NaCH_3CO_2$, $NaCHO_2$, $Na_2C_2O_4$, $Na_3C_6H_5O_7$, $K_2CO_3$, $KOH$, $K_2O_2$, $KO_2KNO_3$, $KCH_3CO_2$, $KCHO_2$, $K_2C_2O_4$, $K_3C_6H_5O_7$ and hydrates thereof.

The precursors of a transition metal M and of rare-earths may be chosen from the salts of volatile inorganic acids such as nitrates and carbonates, the salts of volatile organic acids such as acetates and formates, and the salts of acids that can decompose on heating such as oxalates, malonates and citrates. Very interestingly from an economic viewpoint, they may also be chosen from the salts of conventional inorganic acids, such as sulfates, chlorides and bromides. In the latter case, the reaction medium contains, after step ii) reaction products other than the desired complex oxide(s) of formula (I), in particular soluble chlorides or sulfates, in particular of alkali metals, which are soluble in water and which may be readily separated out in step iii) of the process.

Among the precursors of a transition metal and of rare-earths, examples that may especially be mentioned include: $TiCl_4$, $(NH_4)_2TiO(C_3H_4O_3)_2$, $(NH_4)_2TiO(C_2O_4)_2$, $(NH_4)_2TiF_6$, $Ti(OR^1)_4$, and $Ti(NR^2)_4$ in which each of the groups $R^1$ or, respectively, each of the groups $R^2$, represents, independently of the others, an alkyl group preferably containing from 1 to 10 carbon atoms;

$FeCl_3$, $Fe(SO_4)_3$, $Fe(NO_3)_3$ and $NH_4Fe(SO_4)_2$ and hydrates thereof;

$FeCl_2$, $FeSO_4$, $Fe(C_2O_4)$, $Fe(CH_3CO_2)_2$ (especially for the preparation of $LiFePO_4$ and its solid solutions) and hydrates thereof;

$MnCl_2$, $MnSO_4$, $Mn(C_2O_4)$, $Mn(CH_3CO_2)_2$, $Mn(NO_3)_2$ and hydrates thereof (especially for the preparation of $LiMnPO_4$, $LiMnBO_3$ and solid solutions thereof);

$CoCl_2$, $CoSO_4$, $Co(C_2O_4)$, $Co(CH_3CO_2)_2$, $Co(NO_3)_2$ and hydrates thereof;

$NiCl_2$, $NiSO_4$, $Ni(C_2O_4)$, $Ni(CH_3CO_2)_2$, $Ni(NO_3)_2$ and hydrates thereof;

$CrCl_3$, $Cr_2(SO_4)_3$, $Cr(NO_3)_3$ and hydrates thereof;

$VOCl_2$, $VOSO_4$ and hydrates thereof.

The precursors of the oxyanions $YO_4$ may be chosen from the corresponding acids such as $H_2SO_4$, $H_3PO_4$; thermally labile ammonium, amine, imidazole or pyridine salts, for instance $NH_4HSO_4$, $(NH_4)_2SO_4$, $NH_4HSeO_4$, $(NH_4)_2SeO_4$, $NH_4H_2PO_4$, $(NH_4)_2HPO_4$, $NH_4H_2AsO_4$ and $(NH_4)_2HAsO_4$; silicon or germanium derivatives in the form of nanometric $SiO_2$ or $GeO_2$; tetraalkoxysilane or germane derivatives such as $(R^3O)_4Si$ and $(R^3O)_4Ge$ or the polymers $—Si[(OR^3)_2—]_p$ (with $0 \leq p \leq 10^4$) and in which $R^3$ represents an alkyl or alkyloxyalkyl group preferably containing from 1 to 10 carbon atoms, preferably a methyl, ethyl or methoxyethyl radical.

It is also possible, in the context of the invention, to introduce the elements of the oxyanions in the form of an alkali metal or alkaline-earth metal salt. This element thus introduced may be incorporated into the complex oxide during the reaction with the ionic liquid or may form a reaction by-product of chloride or sulfate type (if the complex oxide does not introduce this anion), which it is then easy to remove in step iii) by washing with water or in a lower alcohol, for instance methanol, ethanol, ethylene glycol, propylene glycol or glycerol. Examples that may be mentioned include $AHSO_4$, $A_2SO_4$, $AHSeO_4$, $A_2SeO_4$, $AH_2PO_4$, $A_2HPO_4$, $A_3PO_4$, $AH_2AsO_4$, $A_2HAsO_4$, $A_3AsO_4$, $A_4SiO_4$, $A_4GeO_4$, $A_2SiO_3$, $A_2GeO_3$ and $M_2Si_5O_{13}$ in which A represents an alkali metal or alkaline-earth metal. These compounds are particularly advantageous in the form of lithium salts (A=Li): $LiHSO_4$, $Li_2SO_4$, $LiH_2PO_4$, $Li_3PO_4$, $Li_4SiO_4$, $Li_2SiO_3$, $Li_2Si_5O_{13}$. The sodium phosphates $NaH_2PO_4$, $Na_2HPO_4$ and $Na_3PO_4$ are useful for the preparation of sodium iron fluorophosphate.

The precursors of the elements Si and Ge may also be chosen, respectively, from fluorosilicates and fluorogermanates. In this case, they are preferably used in the presence of boron derivatives that are capable of forming $ABF_4$ or $BF_3$, $ABF_4$ being soluble during step iii) and $BF_3$ being volatile.

The fluoride ion precursors are chosen from alkali metal, ammonium, imidazolium or pyridinium fluorides; the oxide ion precursors are chosen from oxides, hydroxides, carbonates and oxalates of the metal A or complexes thereof with ammonium oxalate. The fluoride ions and the oxide ions may be introduced alone or as a mixture with one or more of the other constituent elements of the complex oxide.

The amount of precursors present in the support liquid during step i) is preferably from 0.01% to 85% by mass and even more preferentially from 5% to 60% by mass.

The process of the invention may advantageously be performed for the preparation of a very wide variety of inorganic oxides of formula (I), by choosing the appropriate precursors from those mentioned above.

Among the inorganic oxides of formula (I), mention may be made of:

the phosphates $A_aM_mPO_4$, in particular the compounds $A_aM^1{}_mPO_4$ in which a=1 and A=Li; m ranges from 1 to 0.85 and $M^1$ represents Fe alone or in combination with at least one other metal element chosen from Mg, Co, Ni, Mn, Al, Cr and Ti;

the fluorophosphates $A_aM_mPO_4F$, in particular the compounds $LiM_mPO_4F$, for example $LiFePO_4F$;

the compounds $A_aM_mSO_4F$, in particular the compounds in which A is Li or Na and M represents at least one element chosen from Fe, Mn, Co and Ni, for example $LiFeSO_4F$, $LiCoSO_4F$, $LiNiSO_4F$, $Li(Fe_{1-t}Mn_t)SO_4F$, $NaFeSO_4F$ and $NaCoSO_4F$.

The lithium fluorosullate has a tavorite structure with a triclinic lattice with a space group P-1. Sodium fluorosulfate has a tavorite structure with a monoclinic lattice $P2_1/c$.

A compound $A_aM_mSO_4F$ in the form of a single phase with a tavorite structure is obtained according to the process of the invention from a single precursor for M and $SO_4$, namely the sulfate monohydrate $MSO_4 \cdot H_2O$. The monohydrate may be prepared beforehand, for example by heating under vacuum. It may also be prepared by heating after having been introduced into the support liquid in which it will then react with the other precursors.

The process of the invention may also be used for the preparation of the inorganic oxides of formula (I) below:

silicates, for example fayalite and its solid solutions, in particular silicates of olivine structure $Fe_{2-x-z}Mn_xMg_wSiO_4$, ($0 \leq x$, $w \leq 2$), and mixed silicates with lithium $Li_2Fe_{1-x'-w'}Mn_{x'}Mg_{w'}SiO_4$ ($0 \leq x'$, $w' \leq 1$);

sulfates, for example $Li_2Fe_2(SO_4)_3$ and $Na_2Fe_2(SO_4)_3$;

silicophosphates, for example the compounds $Na_{3+x}Zr_2(P_{1-x}Si_x)_3O_{12}$, $Li_{1-x}Fe_{1+x}P_{1-x}Si_xO_4$, $Li_{1+x}FeP_{1-x}Si_xO_4$, $Li_{2-x}FeSi_{1-x}P_xO_4$, and $Li_{2-x}Mn_{1-w}Mg_wSi_{1-x}P_xO_4$, in which $0 \leq x \leq 1$, $0 \leq w \leq 1$;

phosphosulfates, for example $(LiFePO_4)_2(SO_4)$;

silicosulfates, for example $Li_{2-2x}FeSi_{1-x}S_xO_4$, $0 \leq x \leq 1$;

phosphosilicosulfates, for example $LiM^2P_{1-x-w}Si_xS_wO_4$, $0 \leq x$, $w \leq 1$ mixed fluorophosphates such as $Na_2Fe_{1-x-w}Mn_xMg_wPO_4F$ ($0 \leq x \leq 1$ and $0 \leq w \leq 0.15$) or $LiVPO_4(O_{1-x}F_x)$ and $NaVPO_4(O_{1-x}F_{-x})$ with $0 \leq x \leq 1$, fluorophosphates such as $MPO_4F$ with M=Fe, Mn or Al.

According to one preferred embodiment of the invention, the cations of the ionic liquid are chosen from the cations of the following formulae:

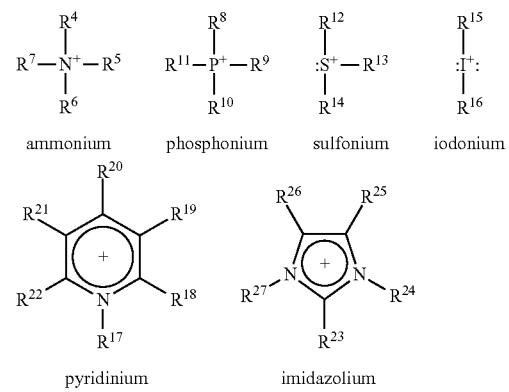

-continued

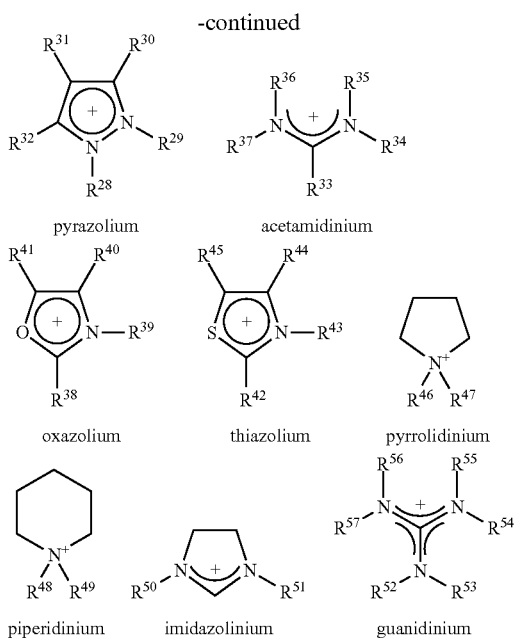

pyrazolium acetamidinium
oxazolium thiazolium pyrrolidinium
piperidinium imidazolinium guanidinium in which:
the radicals $R^4$-$R^{17}$, $R^{27}$, $R^{24}$, $R^{28}$, $R^{29}$, $R^{37}$, $R^{34}$, $R^{39}$, $R^{43}$ and $R^{46}$ to $R^{57}$, independently of each other, represent a $C_1$-$C_{24}$ alkyl, $C_1$-$C_{24}$ arylalkyl or $(C_1$-$C_{24})$alkylaryl radical;
the radicals $R^{18}$ to $R^{22}$, $R^{23}$, $R^{25}$, $R^{26}$, $R^{30}$ to $R^{33}$, $R^{35}$, $R^{36}$, $R^{38}$, $R^{40}$ to $R^{42}$, $R^{44}$ and $R^{45}$ represent a hydrogen atom, a $C_1$-$C_{24}$ alkyl radical, an aryl radical, a $C_1$-$C_{24}$ oxaalkyl radical or a radical $[(CH)_2]_m Q$ in which Q represents OH, CN, C(=O)O$R^{58}$, C(=O)N$R^{59}R^{60}$, N$R^{61}R^{62}$ or a 1-imidazoyl, 3-imidazoyl or 4-imidazoyl radical and m is a positive integer between 0 and 12 inclusive;
the radicals $R^8$ to $R^{16}$ may also denote a $(C_1$-$C_{20})$alkylaryl radical or a group N$R^{63}R^{64}$,
$R^{58}$ to $R^{64}$, independently of each other, represent a hydrogen atom or a $C_1$-$C_{20}$ alkyl, aryl or $C_1$-$C_{20}$ oxaalkyl radical.

The anions of the ionic liquids are preferably chosen from: Cl, Br, I, $RSO_3^-$, $ROSO_3^-$, $[RPO_2]^-$, $[R(R'O)PO_2]^-$, $[(RO)_2PO_2]^-$, $BF_4^-$, $R_fBF_3^-$, $PF_6^-$, $R_fPF_5^-$, $(R_f)_2PF_4^-$, $(R_f)_3PF_3^-$, $R_fCO_2^-$, $R_fSO_3^-$, $[(R_fSO_2)_2N]^-$, $[(R_fSO_2)_2CH]^-$, $[(R_fSO_2)_2C(CN)]^-$, $[R_fSO_2C(CN)_2]^-$, $[(R_fSO_2)_3C]^-$, qjN(CN)$_2^-$, C(CN)$_3^-$, $[(C_2O_4)_2B]^-$ in which:
R and R', which may be identical or different, represent a $C_1$-$C_{24}$ alkyl, aryl or $(C_1$-$C_{24})$alkylaryl radical,
$R_f$ is a fluoro radical chosen from $C_nF_{2n+1}$ in which 0≤n≤8, $CF_3OCF_2$, $HCF_2CF_2$ and $C_6F_5$.

In one particular embodiment, the ionic liquid of the invention comprises an organic polycationic part associated with the number of anions required to ensure the electrical neutrality of the compound. The polycationic part comprises at least two repeating units that each bear a cationic group. According to one variant, the repeating unit of the polycationic part may be a unit bearing a cationic side group, for example one of the above cations in which one of the groups R is a diradical for bonding with the repeating unit forming the chain of the polycationic group. According to another variant, the cationic groups form part of the chain of the polycationic group, two substituents R on a cationic group being diradicals that form a bond with adjacent cationic groups.

Examples of ionic liquids that may be mentioned most particularly include 1-ethyl-3-methylimidazolium trifluoromethanesulphonate (EMI-triflate), 1-ethyl-3-methylimidazolium bis(trifluoromethanesulphonyl)imide (EMI-TFSI), N-methyl -N-propylpyrrolidinium trifluoromethanesulfonate, N-methyl-N-butylpyrrolidinium trifluoromethanesulfonate, N-methyl-N-propylpiperidinium trifluoromethane-sulfonate, N-methyl-N-propylpyrrolidinium trifluoromethanesulfonate, N-methyl -N-butylpiperidinium trifluoromethanesulfonate, N-methyl-N-propylpyrrolidinium bis(trifluoromethanesulfonyl)imide, N-methyl-N-butylpyrrolidinium bis(trifluoro -methanesulfonyl)imide, N-methyl-N-propylpiperidinium bis(trifluoromethane -sulfonyl)imide, N-methyl-N-propylpyrrolidinium bis(trifluoromethane -sulfonyl)imide, N-methyl-N-butylpiperidinium bis(trifluoromethanesulfonyl)imide, N-methyl-N-butyl-pyrrolidinium bis(trifluoromethanesulfonyl)imide, 1,3-dimethyl-imidazolium bis(trifluoromethanesulfonyl)imide, 1-ethyl-3-methylimidazolium bis(trifluoromethanesulfonyl)imide, 1-propyl-3-methylimidazolium bis(trifluoro -methanesulfonyl)imide, 1-butyl-3-methylimidazolium bis(trifluoro -methanesulfonyl)imide,1-hexyl-3-methylimidazolium bis(trifluoromethane -sulfonyl)imide, 1-decyl-3-methylimidazolium bis(trifluoromethanesulfonyl)imide, 1-dodecyl-3-methylimidazolium bis(trifluoromethanesulfonyl)imide, 1-tetradecyl-3-methylimidazolium bis(trifluoromethanesulfonyl)imide, 1-hexadecyl-3-methylimidazolium bis(trifluoromethanesulfonyl)imide, 1-octadecyl-3-methylimidazolium bis(trifluoromethanesulfonyl)imide, 1-2-dimethyl-3-propyl -imidazolium bis(trifluoromethanesulfonyl)imide, 1,3-dimethylimidazolium trifluoromethanesulfonate, 1-ethyl-3-methylimidazolium trifluoromethane -sulfonate, 1-propyl-3-methylimidazolium trifluoromethanesulfonate, 1-butyl-3-methylimidazolium trifluoromethanesulfonate, 1-hexyl-3-methylimidazolium trifluoromethanesulfonate, 1-decyl-3-methylimidazolium trifluoromethane -sulfonate, 1-dodecyl-3-methylimidazolium trifluoromethanesulfonate, 1-tetradecyl-3-methylimidazolium trifluoromethanesulfonate, 1-hexadecyl-3-methyl -imidazolium trifluoromethanesulfonate, 1-octadecyl-3-propylimidazolium trifluoromethanesulfonate, and mixtures thereof.

The ionic liquid used in step i) may also contain one or more carbon precursors chosen from simple carbohydrates such as sugars and polymerized carbohydrates such as starch and cellulose. When they are used, these carbon precursors make it possible to give the inorganic oxides of the invention surface conductivity. Specifically, the carbon precursors are soluble in the ionic liquids and become distributed at the surface of the oxide particles. The heating step gives rise to a start of carbonization and may in this case be continued beyond 380° C. (for example up to 700° C.), preferably under an inert atmosphere, to increase the surface conductivity of the oxide.

According to one preferred embodiment of the invention, the heating temperature of the suspension during step ii) is between 100 and 350° C. and even more preferentially between 150 and 280° C.

According to one preferred embodiment, the heating step ii) is performed under an inert atmosphere, at atmospheric pressure. Specifically, one of the important advantages of the process in accordance with the invention is that it does not require a chamber under pressure due to the absence of volatility of the ionic liquid(s). Step ii) may even be performed continuously, in a heated chamber in which circulate the ionic liquid and the precursors of the inorganic oxide of formula (I), with a residence time that allows the reaction to be complete.

The duration of the heating step ii) generally ranges from 10 minutes to 200 hours and preferably from 3 to 48 hours.

The separation of the inorganic compound of formula (I) during step iii) may be performed via any technique known to those skilled in the art, for instance by extraction of the ionic liquid with a solvent or by centrifugation and removal of the possible by-products with water or an alcohol containing from 1 to 6 carbon atoms.

At the end of the synthesis, the inorganic compound of formula (I) may be washed, for example with water and/or with an organic solvent, for instance acetone, and then used without further purification.

Also at the end of the synthesis, the ionic liquid may be recovered and washed, preferably with an acidic solution, for instance an aqueous solution of hydrochloric acid, sulfuric acid or sulfamic acid. The washing may also be performed with water, when compound (I) is not a fluorosulfate. After washing, and drying (for example on a Rotavapor®) or under a primary vacuum, the ionic liquid may thus be reused for a new synthesis, which is very advantageous from an economic viewpoint.

Conventionally, the inorganic oxides of formula (I) may be used in various applications as a function of the elements constituting them. By way of example, the inorganic oxides of formula (I) of the invention may be used as components for the manufacture of electrodes, as ceramics, as magnetic materials for data storage, or alternatively as pigments.

The present invention is illustrated by the following embodiment examples, to which it is not, however, limited.

In the examples, unless otherwise mentioned, $FeSO_4.H_2O$ was prepared from $FeSO_4.7H_2O$ by heating under vacuum at 200° C., or by heating $FeSO_4.7H_2O$ in the ionic liquid EMI-TFSI at 250° C. for 2 hours.

Figure 10A:
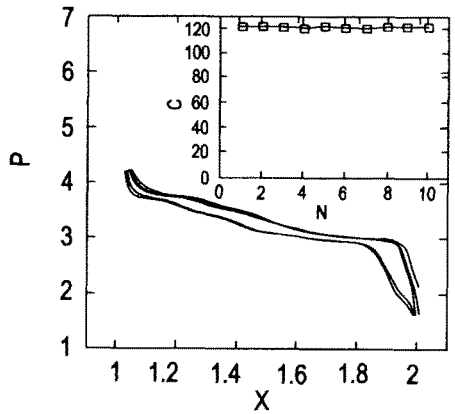
Figure 10B:
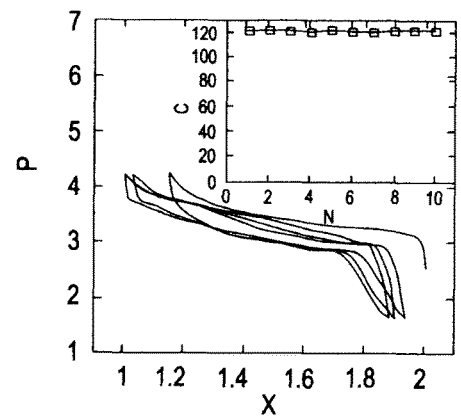
Figure 11A:
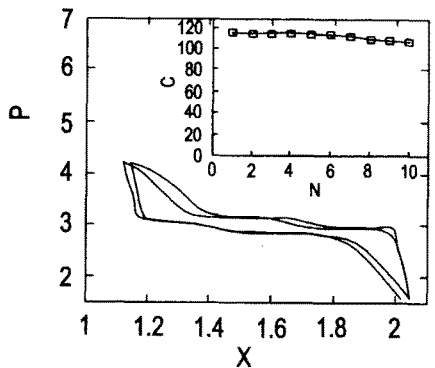
Figure 11B:
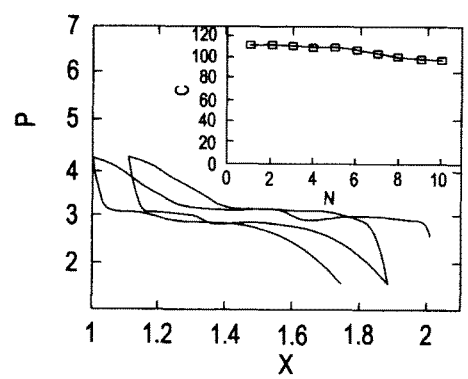

FIGS. 10a and 10b concern a lithium cell, and FIGS. 11a and 11b concern a sodium cell containing the material of the invention according to Example 5 (figures a) and the material according to the invention of Example 6 (figures b). In each of the figures, the variation of the potential P (in V) is given as a function of the content x of alkali metal during the first two cycles. The insert represents the change in capacitance C (in mAh/g) as a function of the number of cycles N.

Figure 12:
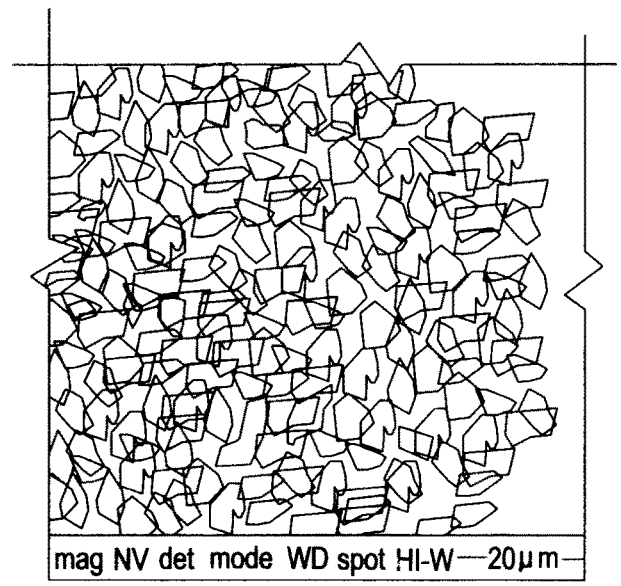

FIG. 12 represents the image obtained by SEM for the material $LiFeSO_4F$ of Example 13.

Figure 13A:
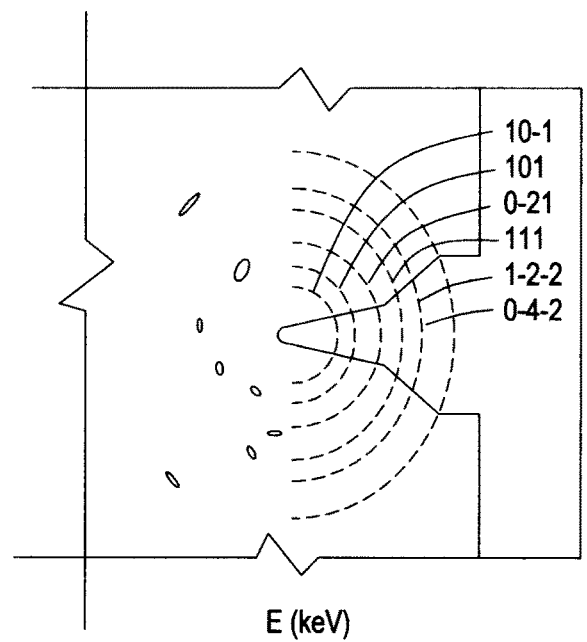
Figure 13B:
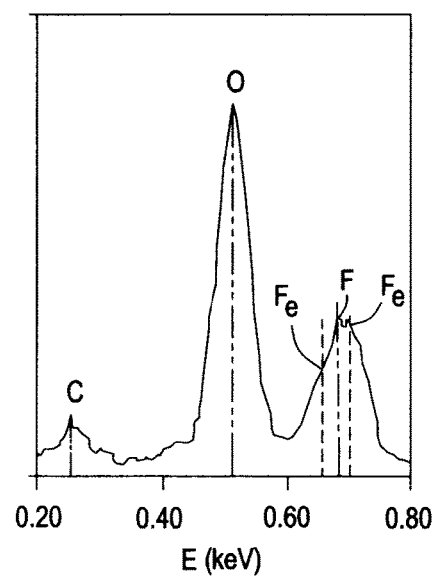

FIG. 13a represents the TEM image, more particularly the corresponding SAED diagram, for the material $LiFeSO_4F$ of Example 13, and FIG. 13b represents the EDS spectrum, which shows the presence of F. The intensity is given on the y-axis (in arbitrary units) as a function of the energy E (in keV) on the x-axis.

Figure 14:
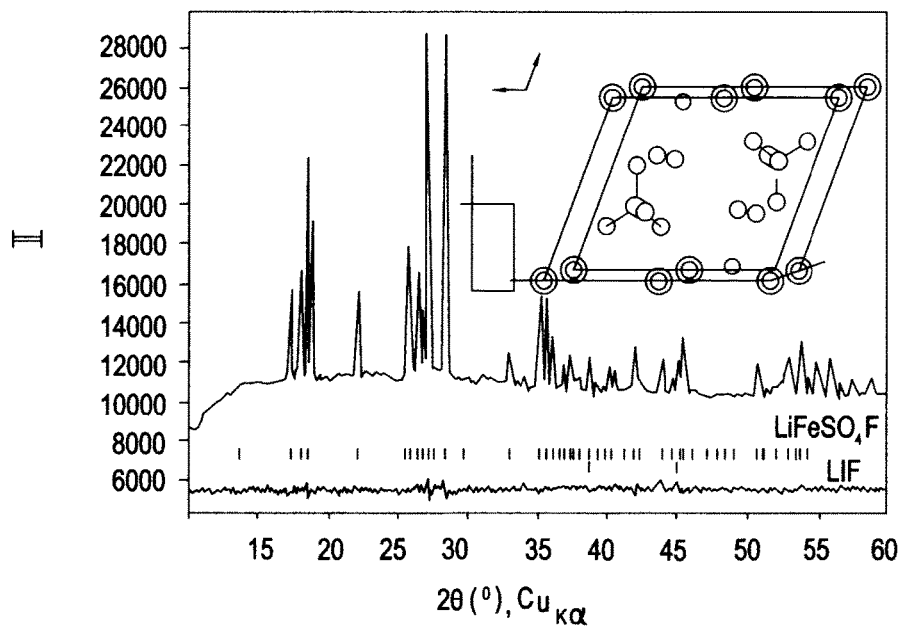

FIG. 14 represents the X-ray diffraction diagram, and, in the form of an insert, the structure of the material $LiFeSO_4F$ of Example 13.

Figure 15:
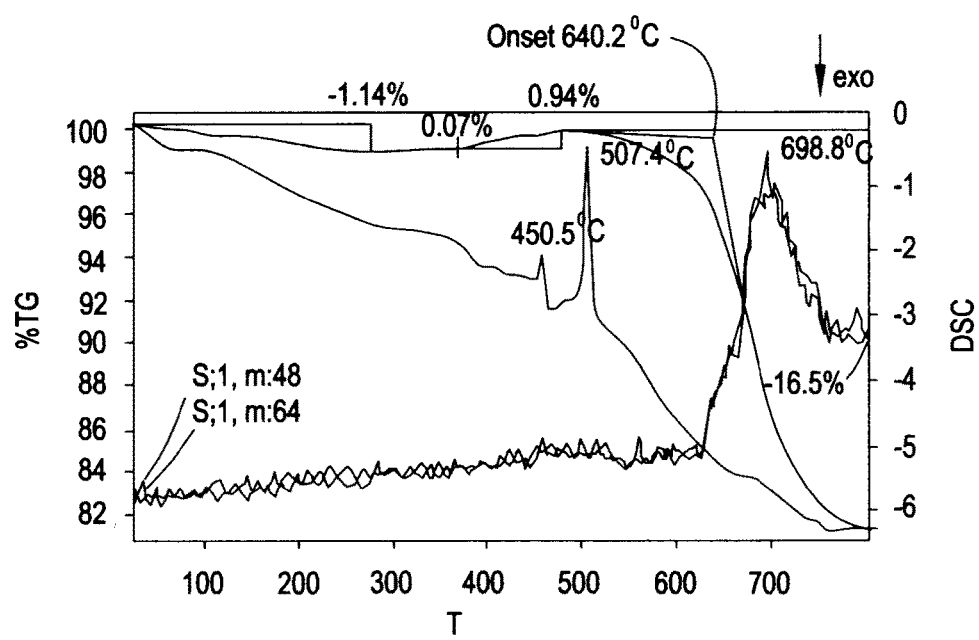

FIG. 15 represents the diagram obtained during the characterization by TGA coupled with mass spectrometry, of the material $LiFeSO_4F$ of Example 13.

Figure 16:
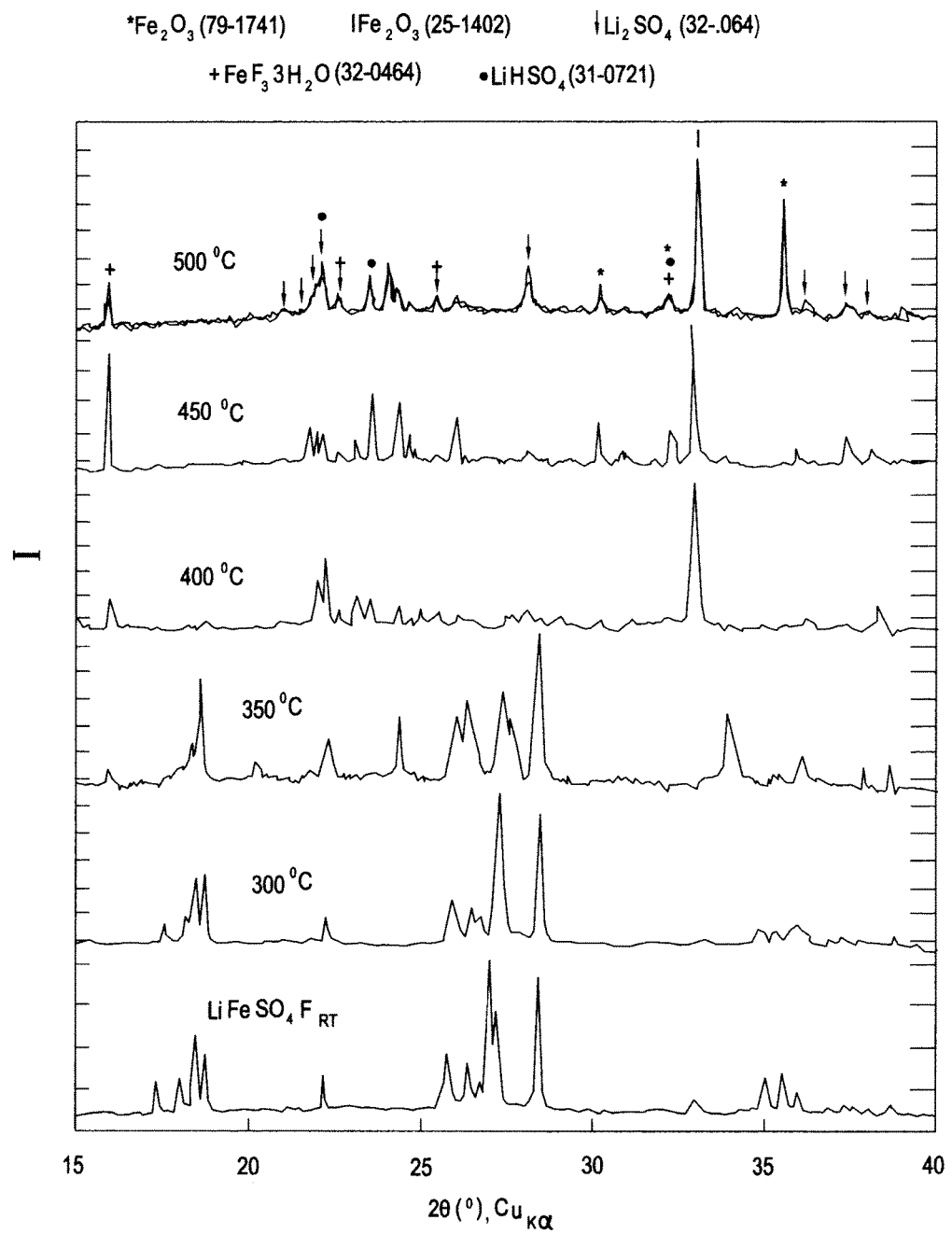

FIG. 16 represents the change in the X-ray diffraction diagram during the increase in temperature for a material $LiFeSO_4F$.

Figure 17:
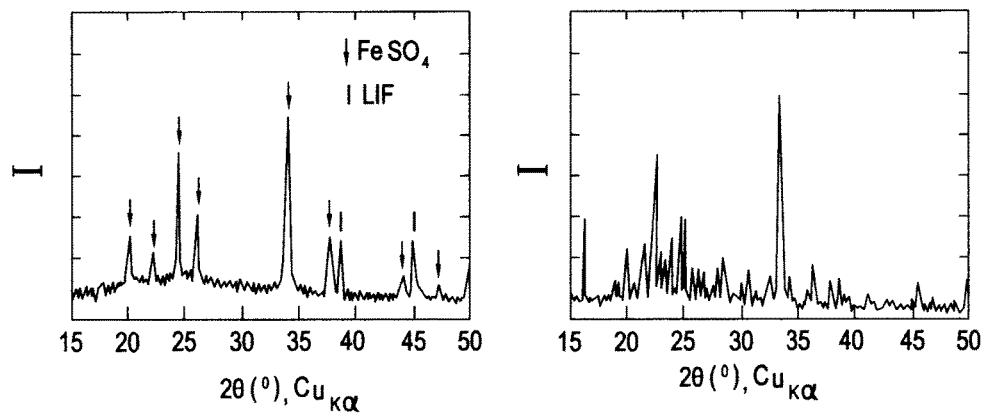
Figure 18:
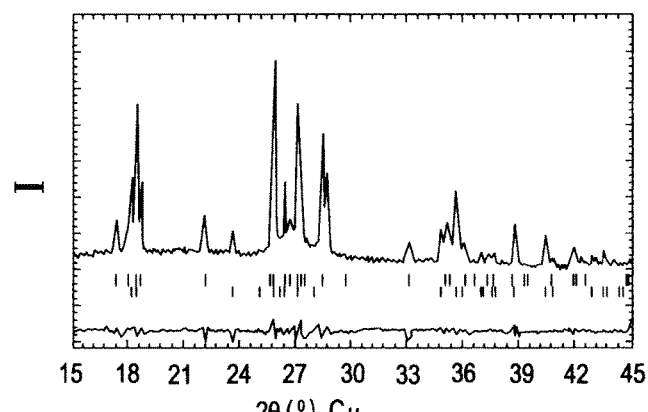
Figure 19:
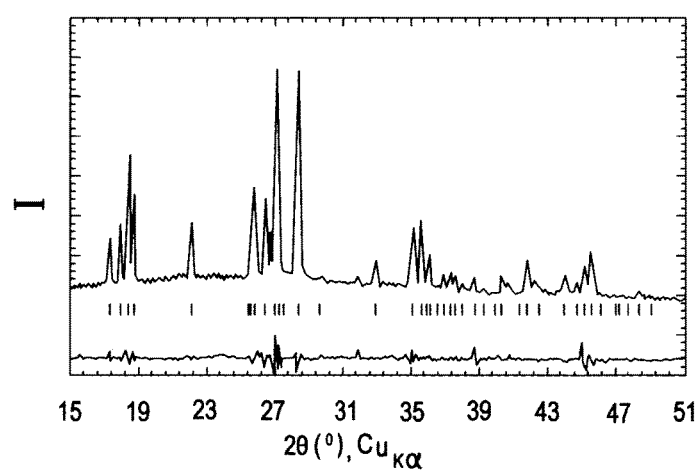
Figure 20:
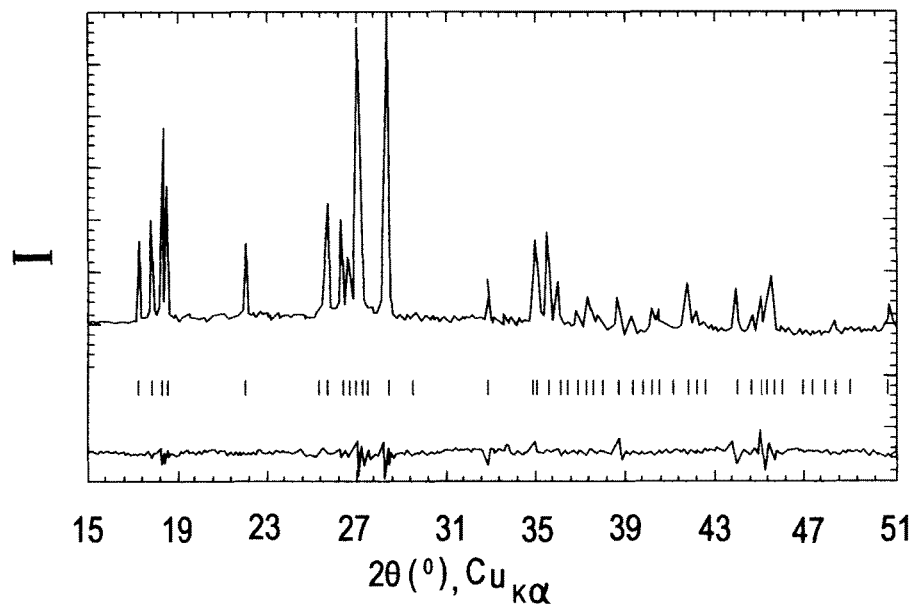
Figure 21:
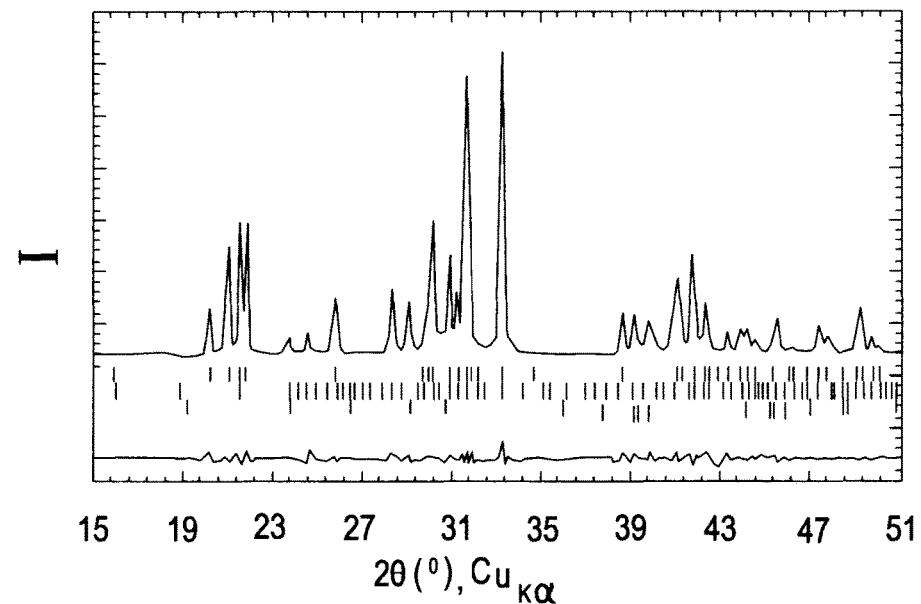

FIG. 17 represents the X-ray diffraction diagram for an equimolar mixture of anhydrous $FeSO_4$ and of LiF before heat treatment (FIG. 17a) and after heat treatment in air at 450° C. for 15 minutes (FIG. 17b).

FIGS. 18 to 21 represent the X-ray diffraction diagram for Examples 15 to 18, respectively.

Figure 22:
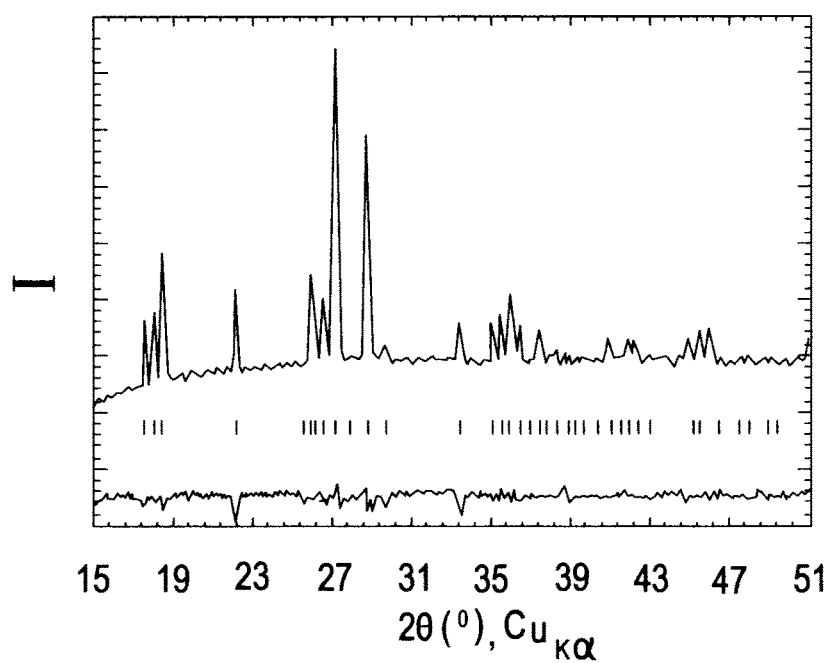
Figure 23:
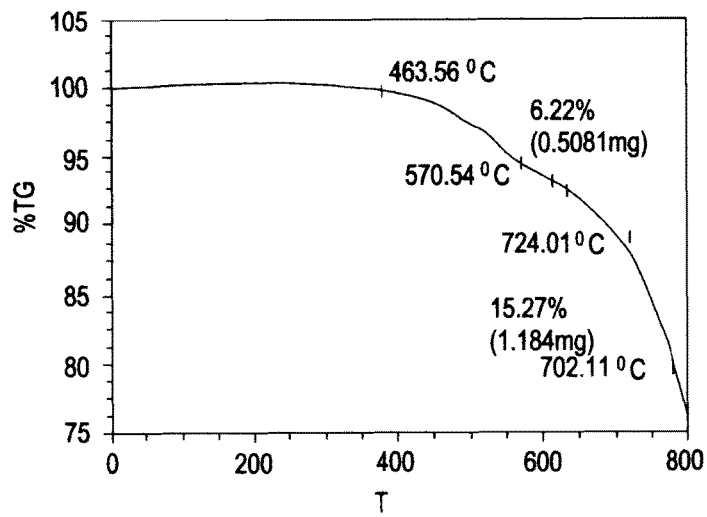

FIGS. 22 and 23 represent the X-ray diffraction diagram and the diagram obtained during TGA characterization of the material $LiCoSO_4F$ of Example 19.

Figure 24:
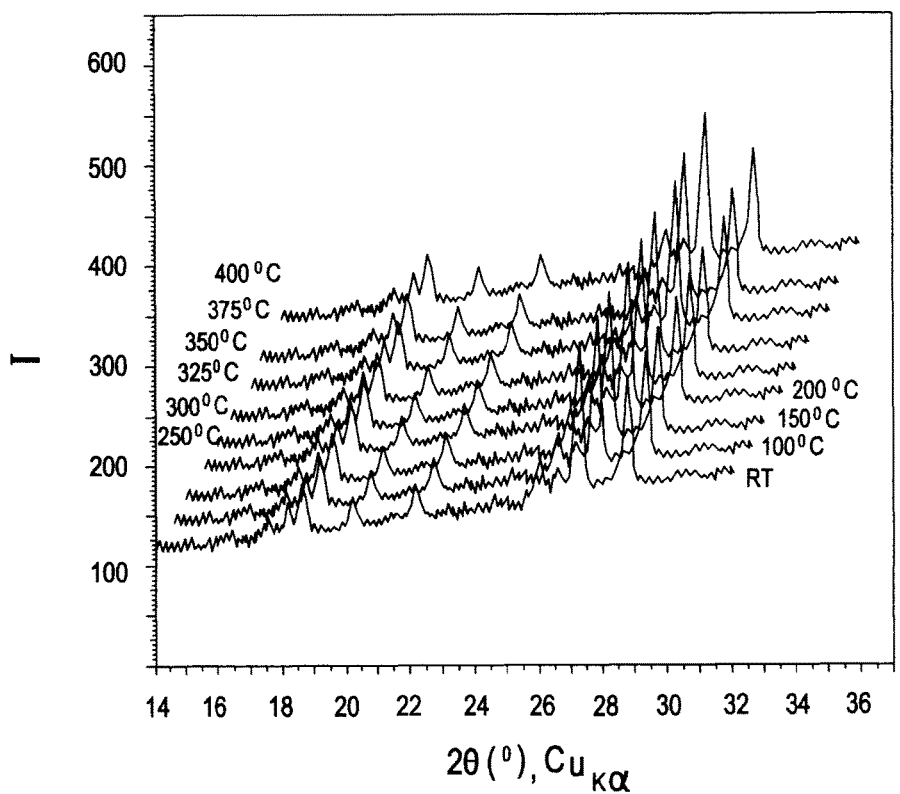

FIG. 24 represents the change in X-ray diffraction diagram during the increase in temperature, for a sample of $LiCoSO_4F$.

Figure 25:
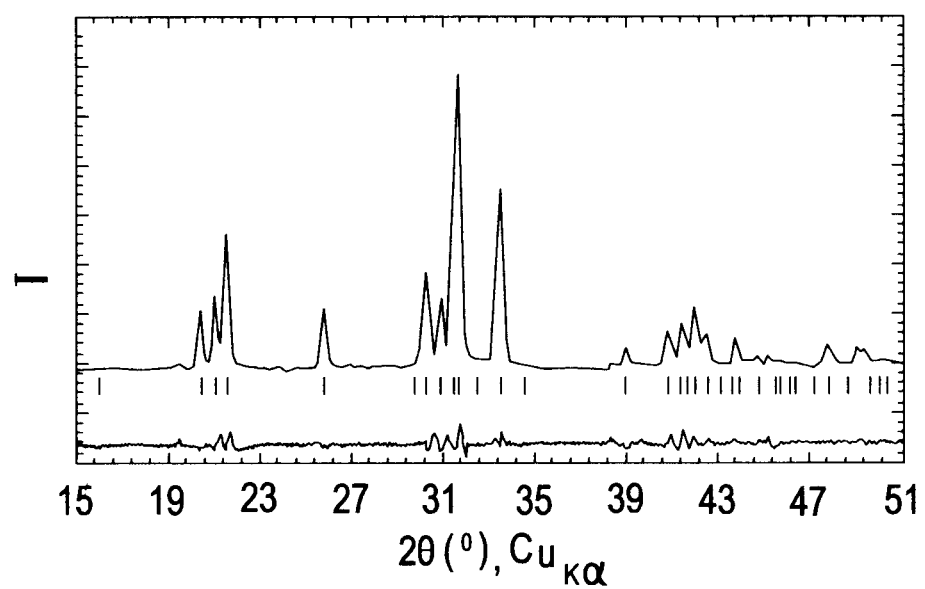
Figure 26:
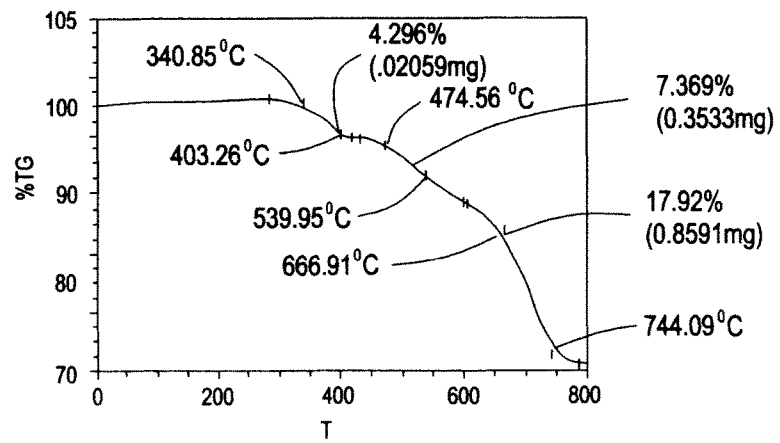

FIGS. 25 and 26 represent, respectively, the X-ray diffraction diagram and the diagram obtained during characterization by TGA of the material $LiNiSO_4F$ of Example 20.

Figure 27:
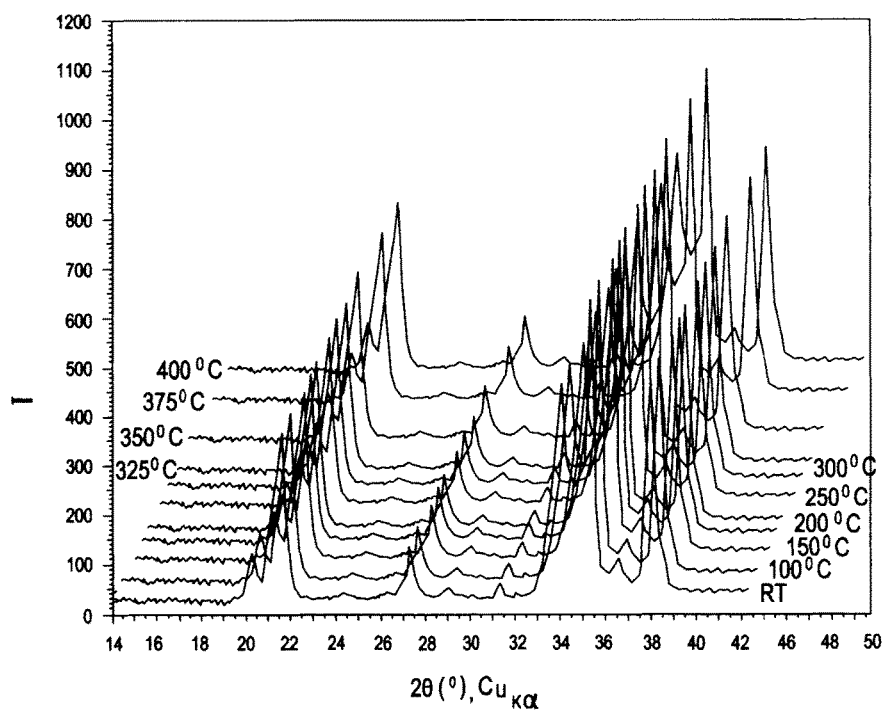

FIG. 27 represents the change in the X-ray diffraction diagram during the increase in temperature, for a sample of $LiNiSO_4F$.

Figure 28:
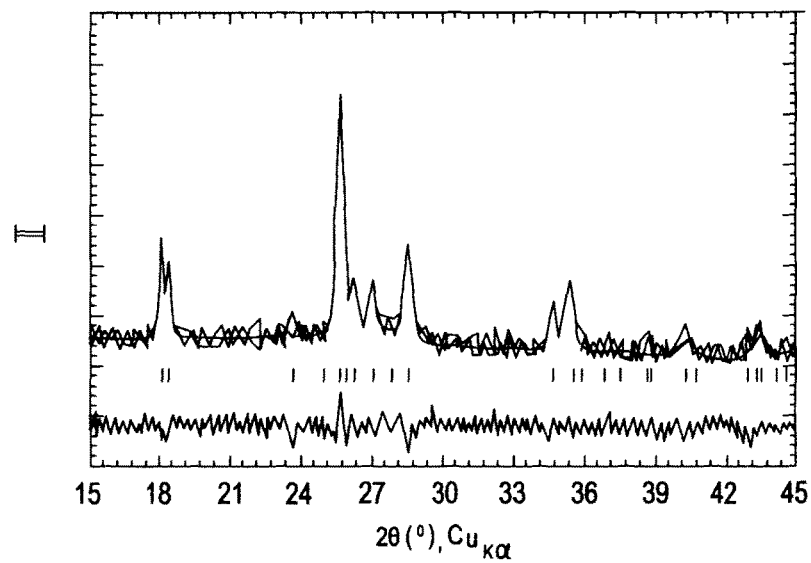
Figure 29:
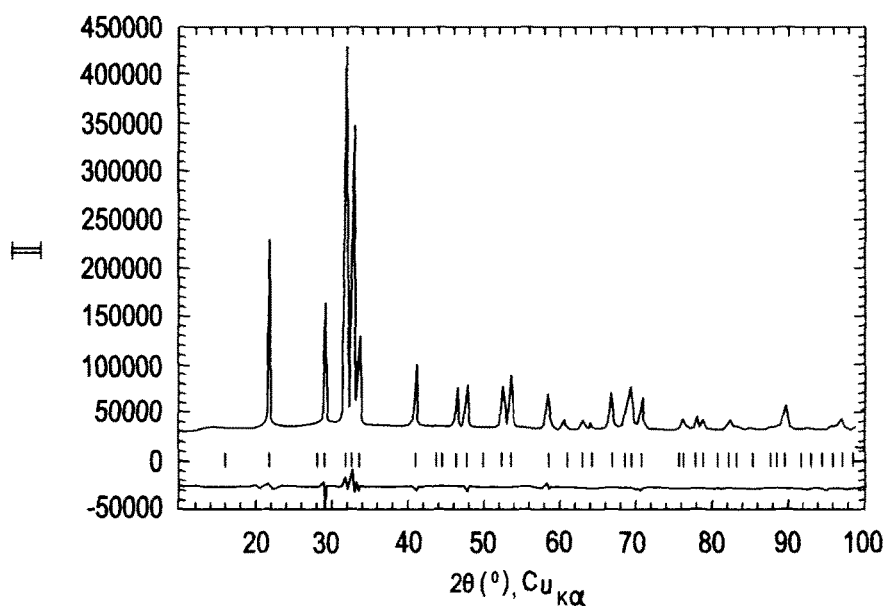

FIGS. 28 and 29 represent the X-ray diffraction diagrams, respectively, for the solid solution $Fe_{0.5}Mn_{0.5}SO_4.H_2O$ of Example 21 and for the compound $FeSO_4F$ of Example 22.

Figure 30:
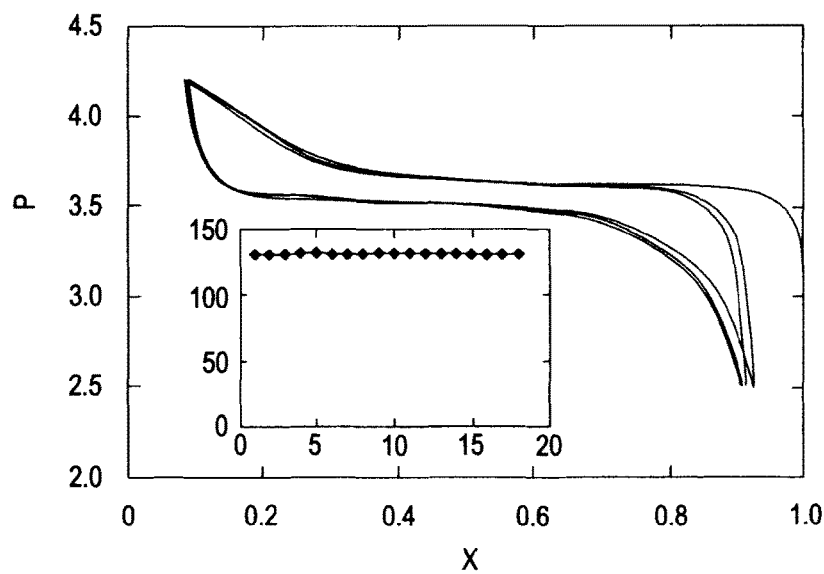
Figure 31:
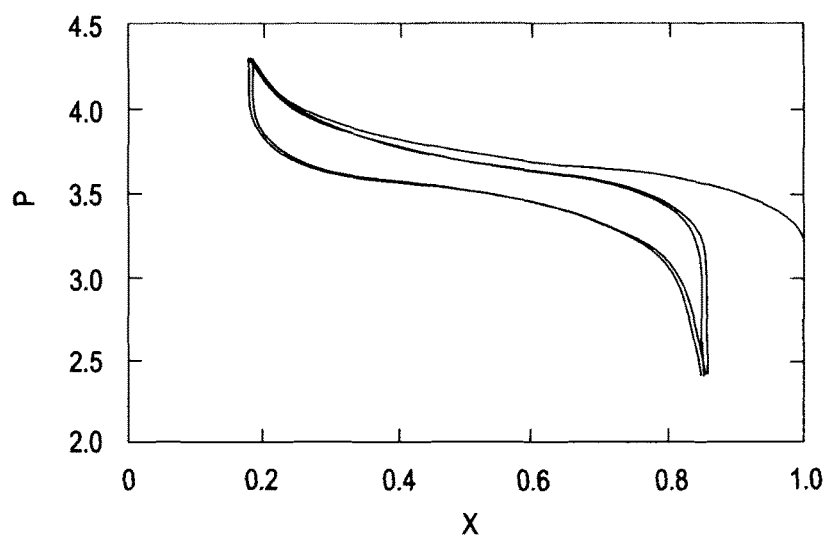
Figure 32:
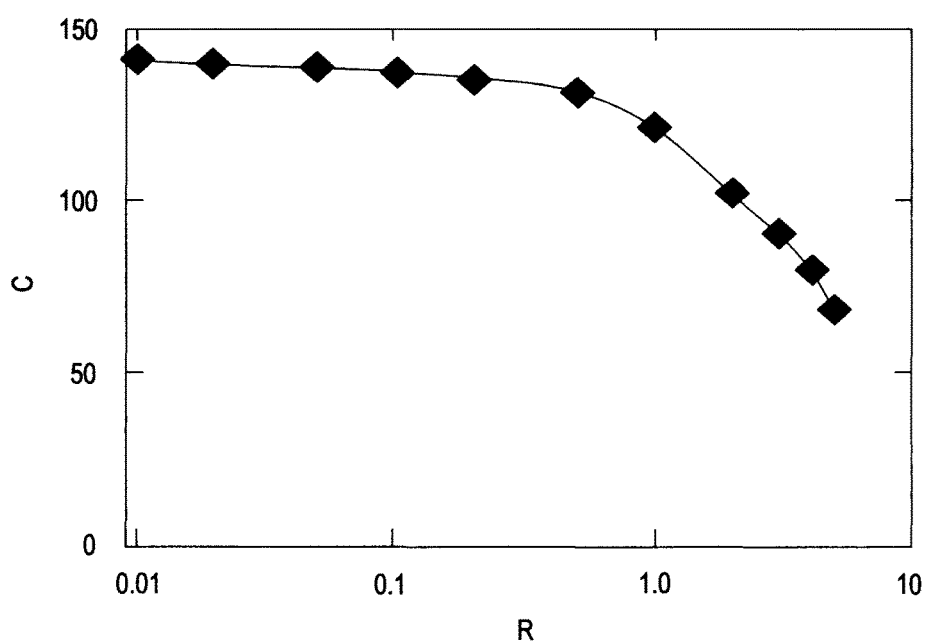

FIGS. 30 to 32 correspond to a compound of Example 16. In FIG. 30, the main curve represents the variation in potential as a function of the level of insertion x of lithium, during cell cycling at a regime of C/10, and the insert represents the change in capacitance of the cell as a function of the cycle number N. FIG. 31 represents the variation in potential as a function of the level of insertion x of lithium, during cell cycling at a regime of C/2. FIG. 32 represents the variation in capacitance as a function of the cycling regime R.

In the X-ray diffraction diagrams, the intensity I (in arbitrary units) is given on the y-axis, and the wavelength $2\theta$ is given on the x-axis.

EXAMPLE 1

Synthesis of $LiFePO_4$ in the ionic liquid 1-ethyl-3-methylimidazolium bis(trifluoromethanesulfonyl)imide In this example, the synthesis of $LiFePO_4$ was performed by precipitation in a 50 ml round-bottomed flask.

To 1 ml of 1-ethyl-3-methylimidazolium bis(trifluoromethanesulfonyl)imide (or EMI-TFSI) (supplied by the company Solvionic) containing 2 ml of 1,2-propanediol and 0.5 g of urea were added 0.524 g of 99% $LiH_2PO_4$ (Aldrich) and 1 g of $FeCl_2.4H_2O$. After stirring for 10 minutes, the mixture (suspension) was brought to a temperature of 180° C. with a temperature increase rate of 1° C./minute. The temperature was maintained at 180° C. for 10 hours, and the reaction medium was then cooled to room temperature. After recovery by filtration, the powder of $LiFePO_4$ is washed with 5 ml of acetone, and then with twice 50 ml of distilled water, and finally with 5 ml of acetone, and is dried in an oven at 60° C. 1 g of $LiFePO_4$ is obtained in a yield of 95%.

Figure 1:
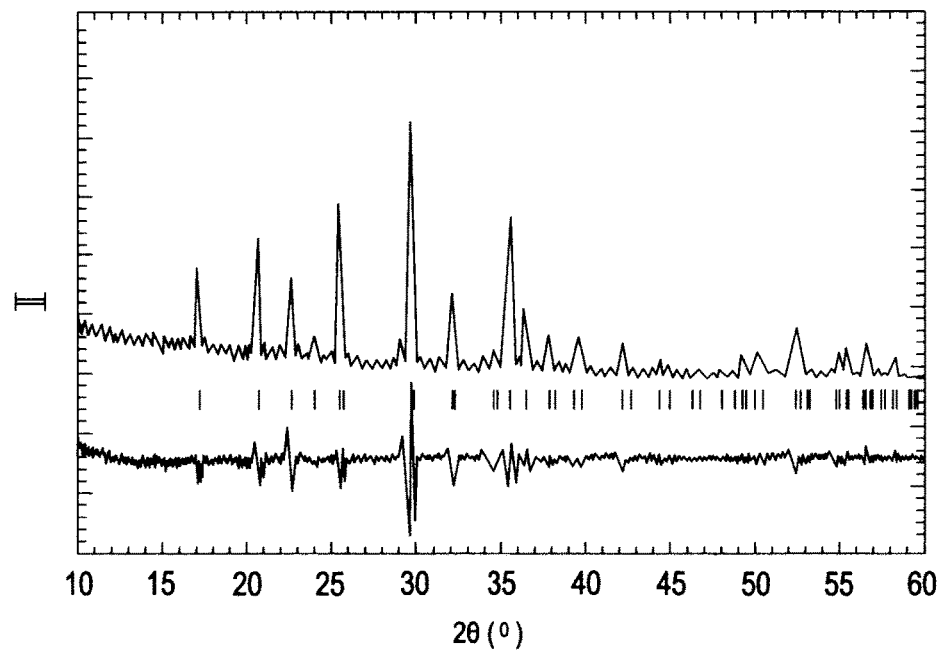
FIGS. 1-2 represent the X-ray diffraction diagram of the material $LiFePO_4$ obtained, respectively, in Examples 1-2.

The compound thus obtained was then analyzed by X-ray diffraction (XR) with a copper cathode. The corresponding diffractogram is shown in the attached FIG. 1. It shows that the inorganic oxide $LiFePO_4$ is a single phase of orthorhombic structure. The morphology of the $LiFePO_4$ thus obtained is as follows:

SG: Pnma (62)

a=10.33235 (5) Å; b=6.00502 (6) Å; c=4.69804 (3) Å

The ionic liquid used for the synthesis of the oxide LiFePO$_4$ was then recovered and washed with 50 ml of water, then with twice 50 ml of a hydrochloric acid solution at a concentration of 2 mol/l, and finally with 50 ml of water, and then dried on a Rotavapor®.

EXAMPLE 2

Synthesis of LiFePO$_4$ in the Ionic Liquid EMI-TFSI

The synthesis of LiFePO$_4$ was performed by precipitation in a 50 ml round-bottomed flask. 0.524 g of 99% LiH$_2$PO$_4$ (Aldrich) and 0.908 g of Fe(C$_2$O$_4$).2H$_2$O were added to 15 ml of EMI-TFSI. After stirring for 10 minutes, the suspension was brought to a temperature of 250° C. with a temperature increase rate of 1 C/minute. The temperature of the reaction medium was maintained at 250° C. for 24 hours, and the medium was then cooled to room temperature. After recovery by filtration, the LiFePO$_4$ powder was washed with 50 ml of acetone, then with twice 50 ml of water and finally with 50 ml of acetone and dried in an oven at 60° C. 1.53 g of LiFePO$_4$ were obtained in a yield of 97%.

Figure 2:
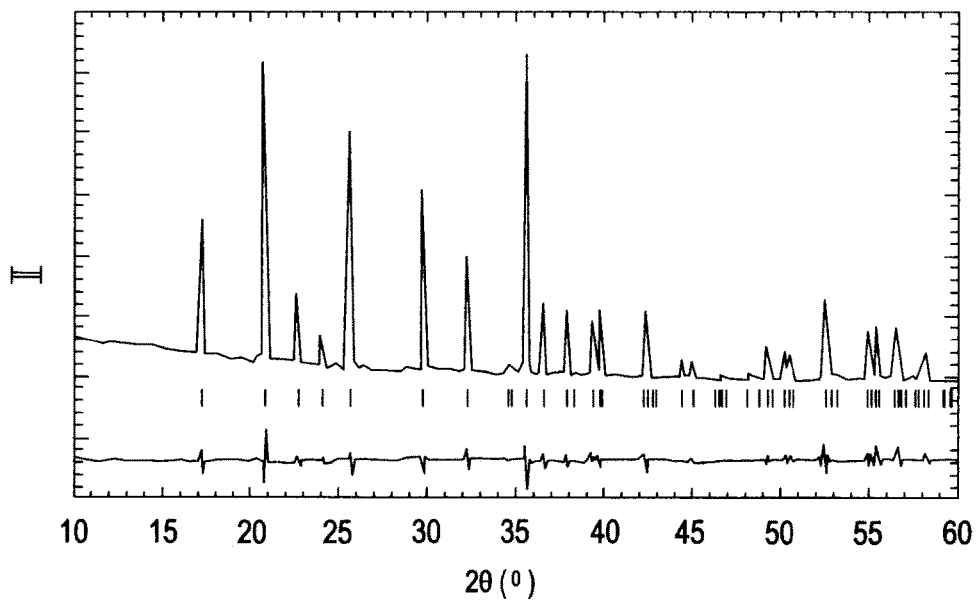

The compound thus obtained was analyzed by X-ray diffraction with a copper cathode. The corresponding diffractogram is shown in the attached FIG. 2. It shows that the inorganic oxide LiFePO$_4$ is a single phase that has the same orthorhombic structure as the sample obtained according to Example 1.

The ionic liquid was recovered in the same manner as in Example 1.

EXAMPLE 3

Synthesis of LiFePO$_4$ in EMI-TFSI in the Presence of Traces of 1-tetradecyl-3-methylimidazolium bis(trifluoromethanesulfonyl)imide The synthesis of LiFePO$_4$ was performed in a bomb, $5 \times 10^{-3}$ mol of LiH$_2$PO$_4$ and $5 \times 10^{-3}$ mol of Fe(C$_2$O$_4$).2H$_2$O were added to 10 ml of EMI-TFSI containing traces of 1-tetradecyl-3-methylimidazolium bis(trifluoromethanesulfonyl)imide (used as surfactant to modify the form of the particles). After stirring, the reaction mixture was brought to a temperature of 250° C. with a temperature increase rate of 1° C./minute. The temperature of the reaction medium was maintained at 250° C. for 24 hours, and the medium was then cooled to room temperature. After recovery, washing and drying as indicated above in Example 2, the expected product was obtained. Analysis by X-ray diffraction showed a single phase of LiFePO$_4$.

EXAMPLE 4

Synthesis of LiFePO$_4$ in 1-ethyl-3-methylimidazolium trifluoromethanesulfonate (EMI-triflate) containing traces of 1-tetradecyl-3-methylimidazolium bis(trifluoromethanesulfonyl)imide The synthesis of LiFePO$_4$ was performed in a bomb. $5 \times 10^{-3}$ mol of LiH$_2$PO$_4$ and $5 \times 10^{-3}$ mol of Fe(C$_2$O$_4$).2H$_2$O were added to 10 ml of EMI-triflate containing traces of 1-tetradecyl-3-methylimidazolium bis(trifluoromethanesulfonyl)imide (used as surfactant to modify the form of the particles). After stirring, the reaction mixture was brought to a temperature of 250° C. with a temperature increase rate of 1° C./min. The temperature of the reaction medium was maintained at 250° C. for 24 hours, and the medium was then cooled to room temperature. After recovery, washing and drying as indicated above in Example 2, the expected product was obtained. Analysis by X-ray diffraction showed a single phase of LiFePO$_4$.

EXAMPLE 5

Synthesis of Na$_2$FePO$_4$F from FeF$_2$ and Na$_3$PO$_4$ 1 g of an FeF$_2$/Na$_3$PO$_4$ equimolar mixture (obtained by grinding for 10 minutes) was introduced into 5 ml of 1-butyl-2,3-dimethylimidazolium bis(trifluoromethanesulfonyl)imide. The mixture was heated at 270° C. for 48 hours and then allowed to cool to room temperature. The powder recovered after filtration is washed with 20 ml of acetone to remove the traces of ionic liquid, rinsed rapidly with cold water to remove the traces of NaF formed during the synthesis, washed with 20 ml of acetone, and then dried in an oven at 60° C.

Figure 3:
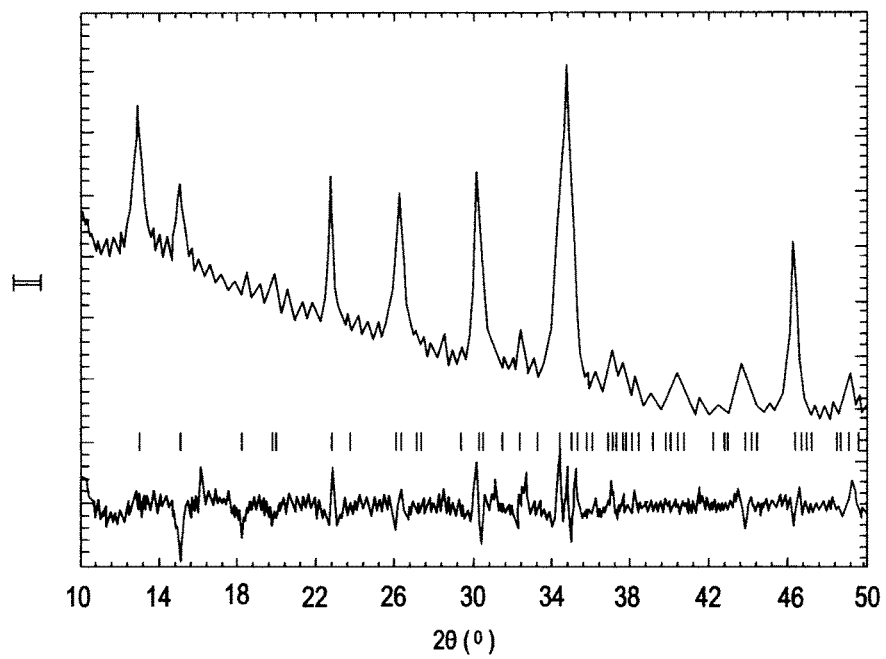
FIGS. 3 to 4 represent the X-ray diffraction diagram for the materials $Na_2FePO_4F$ of Examples 5 and 6.

FIG. 3 shows the X-ray diffractogram of the compound obtained according to the reaction scheme FeF$_2$+Na$_3$PO$_4 \rightarrow$Na$_2$FePO$_4$F+NaF. It shows that said compound is a single orthorhombic phase whose parameters are: SG: P b c n (60); a=5.20681 (4) Å; b=13.58217 (2) Å; c=11.69389 (2) Å.

The compound Na$_2$FePO$_4$F is obtained in the form of particles with a mean size of 20 to 50 nm.

EXAMPLE 6

Preparation of Na$_2$FePO$_4$F from FeF$_2$, FeCl$_2$ and Na$_3$PO$_4$

The procedure of Example 5 was repeated, using 1 g of an equimolar mixture of ½FeF$_2$, ½FeCl$_2$ and Na$_3$PO$_4$ as mixture of precursors.

Figure 4:
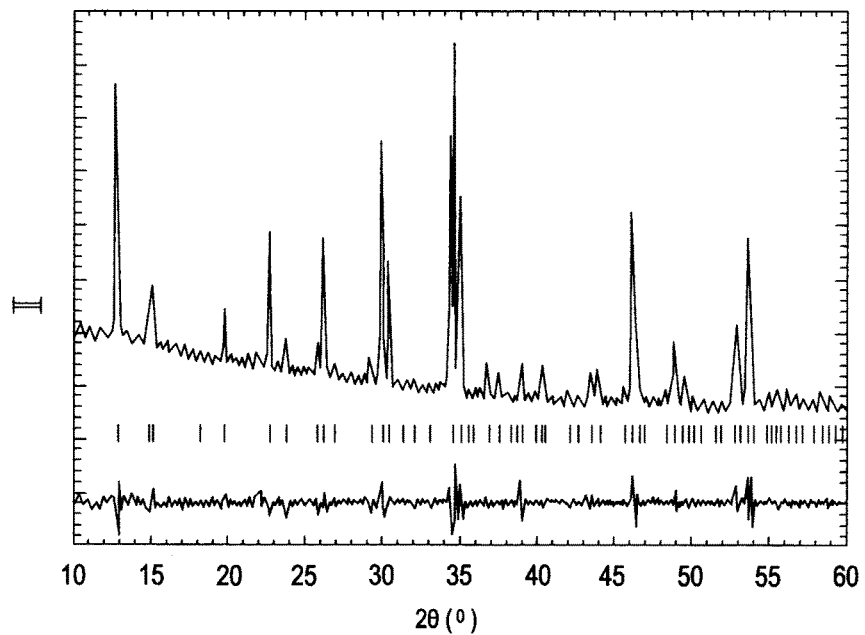

FIG. 4 shows the X-ray diffractogram of the compound obtained according to the reaction scheme ½FeF$_2$+½FeCl$_2$+Na$_3$PO$_4 \rightarrow$Na$_2$FePO$_4$F+NaCl. It shows that said compound is a single orthorhombic phase whose parameters are: SG: P b c n (60); a=5.22576 (4) Å; b=13.86986 (2) Å; c=11.79141 (2) Å.

The compound Na$_2$FePO$_4$F is obtained in the form of particles with a mean size of 1 to 3 μm.

EXAMPLE 7

Synthesis of Na$_2$MnPO$_4$F from MnF$_2$ and Na$_3$PO$_4$

The procedure of Example 1 was repeated, using 1 g of an equimolar mixture of MnF$_2$/Na$_3$PO$_4$ as mixture of precursors.

Figure 5:
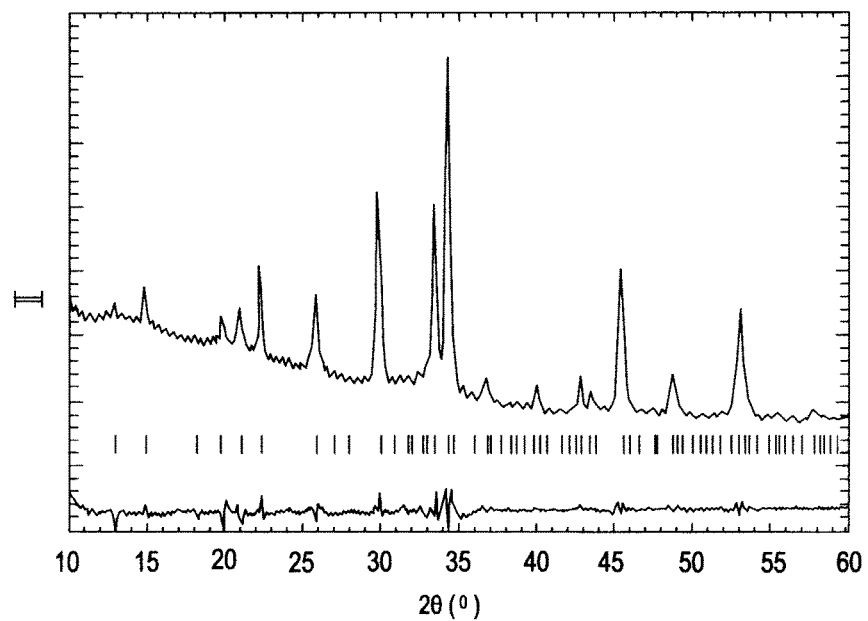
FIGS. 5 to 9 represent the X-ray diffraction diagram for the materials $Na_2MnPO_4F$, $Na_2Fe_{0.95}Mn_{0.5}PO_4$, $LiFePO_4F$, $NaFeSO_4F$, $LiTiPO_4F$ obtained, respectively, in Examples 7 to 11.

FIG. 5 shows the X-ray diffractogram of the compound obtained according to the reaction scheme MnF$_2$+Na$_3$PO$_4 \rightarrow$Na$_2$MnPO$_4$F+NaCl. It shows that said compound is a single monoclinic phase whose parameters are: SG: P 121/N1 (14); a=13.69172 (4) Å; b=5.30686 (2) Å; c=13.70873 (4) Å; β=119.67074°.

EXAMPLE 8

Synthesis of Na$_2$Fe$_{0.95}$Mn$_{0.05}$PO$_4$F from FeF$_2$, FeCl$_2$, MnF$_2$ and Na$_3$PO$_4$ The procedure of Example 6 was repeated, using 1 g of an equimolar mixture of 0.5FeF$_2$, 0.45 FeCl$_2$, 0.05MnF$_2$ and Na$_3$PO$_4$ as mixture of precursors, and by modifying the washing.

The powder formed and recovered by filtration is washed with acetone to remove the traces of ionic liquid, and then twice with 20 ml of methanol to remove the NaCl formed during the synthesis, and then with 20 ml of acetone and finally dried in an oven at 60° C.

Figure 6:
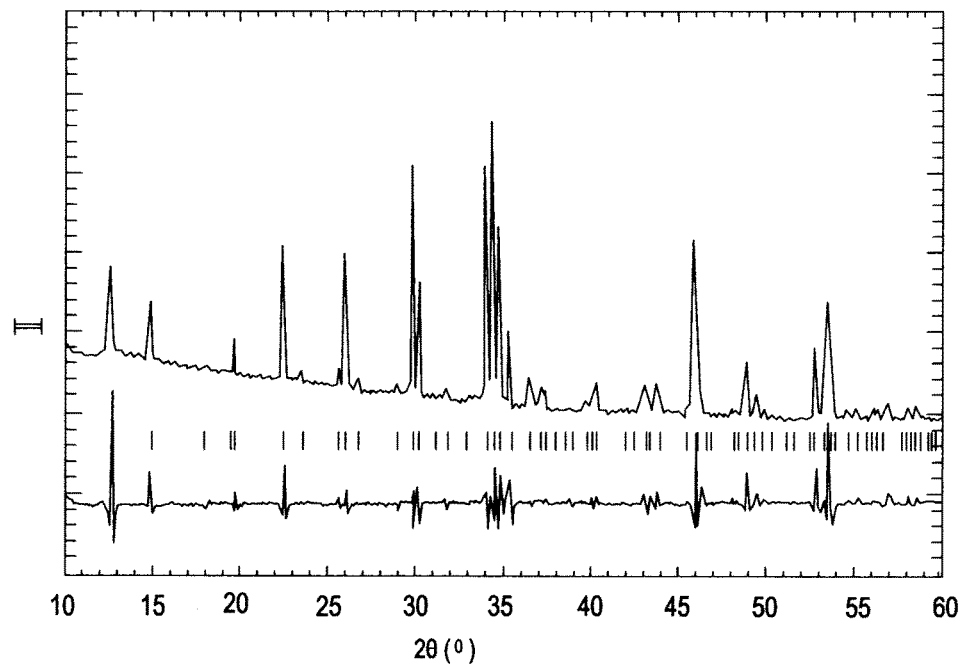

FIG. 6 shows the X-ray diffractogram of the compound obtained according to the reaction scheme

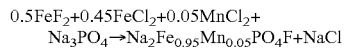
$0.5FeF_2+0.45FeCl_2+0.05MnCl_2+$
$Na_3PO_4 \rightarrow Na_2Fe_{0.95}Mn_{0.05}PO_4F+NaCl$ FIG. 6 shows that said compound is a single orthorhombic phase whose parameters are: SG: P b c n (60); a=5.24863 (4) Å; b=13.85132 (3) Å; c=1.1.79877 (4) Å.

EXAMPLE 9

Synthesis of LiFePO$_4$F from FeF$_3$ and Li$_3$PO$_4$ 1 g of an FeF$_3$/Li$_3$PO$_4$ equimolar mixture (obtained by grinding for 30 minutes) was introduced into 5 ml of 1-butyl-3-methylimidazolium trifluoromethanesulfonate. The mixture was heated at 260° C. for 48 hours, and then allowed to cool to room temperature. The powder recovered after filtration was washed with 20 ml of acetone to remove the traces of ionic liquid, rinsed rapidly with cold water to remove the traces of LiF formed during the synthesis, washed with 20 ml of acetone and then dried in an oven at 60° C.

Figure 7:
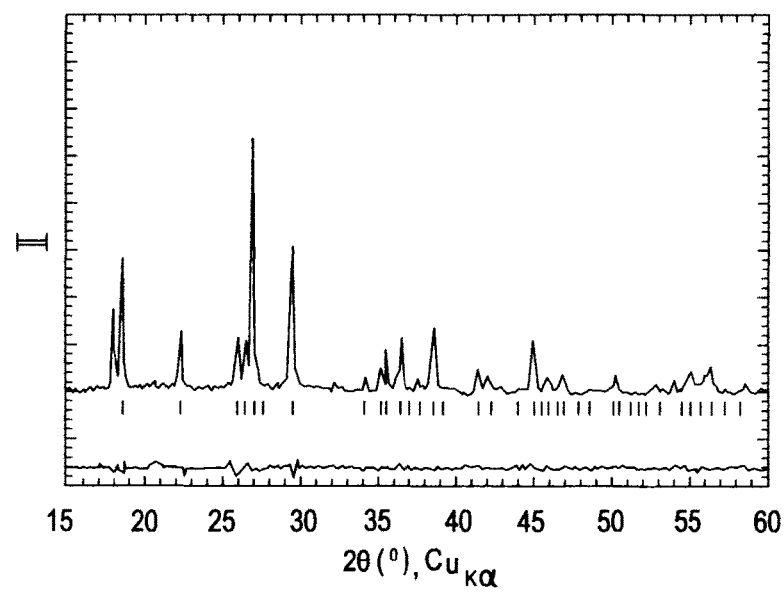

The X-ray diffractogram shown in FIG. 7 is that of the compound obtained according to the reaction scheme FeF$_3$+Li$_3$PO$_4 \rightarrow$LiFePO$_4$F+2LiF. It shows that said compound is a single triclinic phase of space group P-1(2) whose parameters are: a=5.15616 Å, b=5.31041 Å, c=7.48189 Å, α=67.22507, β=67.33746, γ=81.74728°, V=174.303 Å$^3$.

EXAMPLE 10

Synthesis of NaFeSO$_4$F from FeSO$_4$.7H$_2$O and NaF

Figure 8:
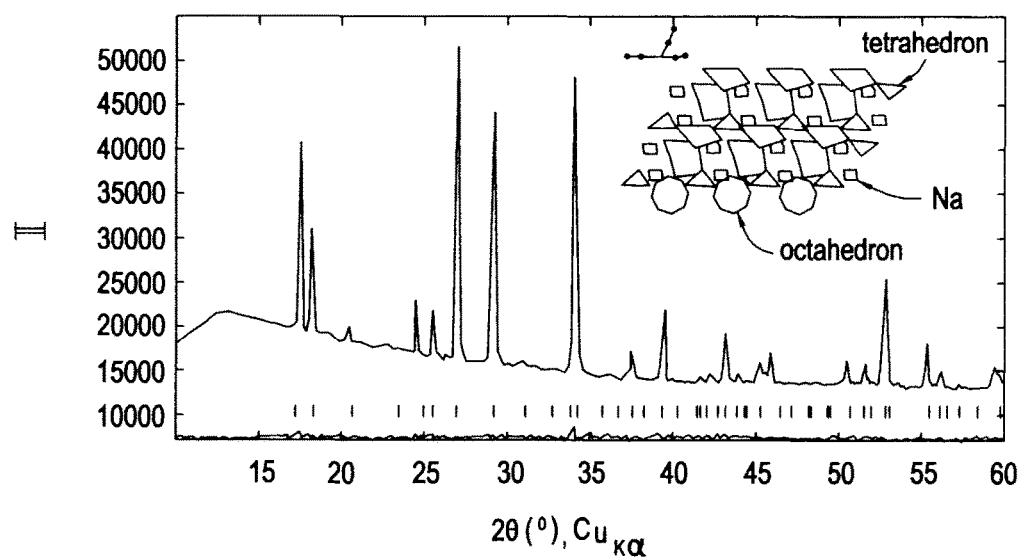

A mixture of 5 ml of EMI-TFSI and 2.808 g of FeSO$_4$.7H$_2$O is placed in an open Parr® bomb and heated to 230° C. After 5 hours of heating, the mixture is cooled to room temperature, 0.42 g of NaF is added and the Parr® bomb is then closed. After 10 minutes of magnetic stirring, the mixture is heated at 250° C. for 24 hours. After cooling to room temperature, the recovered powder is washed twice with 20 ml of acetone and then dried in an oven at 60° C. The X-ray diffraction diagram, shown in FIG. 8, shows the formation of a new crystalline phase in an monoclinic lattice, of space group P2$_1$/c with the lattice parameters: a=6.6798(2) Å, b=8.7061(2) Å, c=7.19124(18)Å, β=113.517(2) and V=383.473(18) Å$^3$.

EXAMPLE 11

Synthesis of LiTiPO$_4$F

The synthesis is performed in a Parr® bomb at 260° C. The limiting factor in the synthesis of LiTiPO$_4$F is the reaction temperature. To have a complete reaction with standard ionic liquids, temperatures above 300° C. are required. However, fluorinated materials decompose at and above 280° C. The use of an ionic liquid protected with a CH$_3$ group in position 2 in the presence of an OH (hydroxyl) group makes it possible to reduce the reaction temperature by increasing the solubility of the precursors.

1 g of an equimolar mixture of TiF$_3$ and Li$_3$PO$_4$ prepared by grinding for 30 minutes is added to 5 ml of 1,2-dimethyl (3-hydroxypropyl)imidazolium bis(trifluoromethanesulfonyl)imide. After stirring for 20 minutes, the mixture is heated at 260° C. for 48 hours and then cooled to room temperature. The powder recovered by filtration is washed with 20 ml of acetone to remove the traces of ionic liquid, rinsed with cold water to remove the traces of LiF formed during the synthesis, washed with 20 ml of acetone and then dried in an oven at 60° C.

Figure 9:
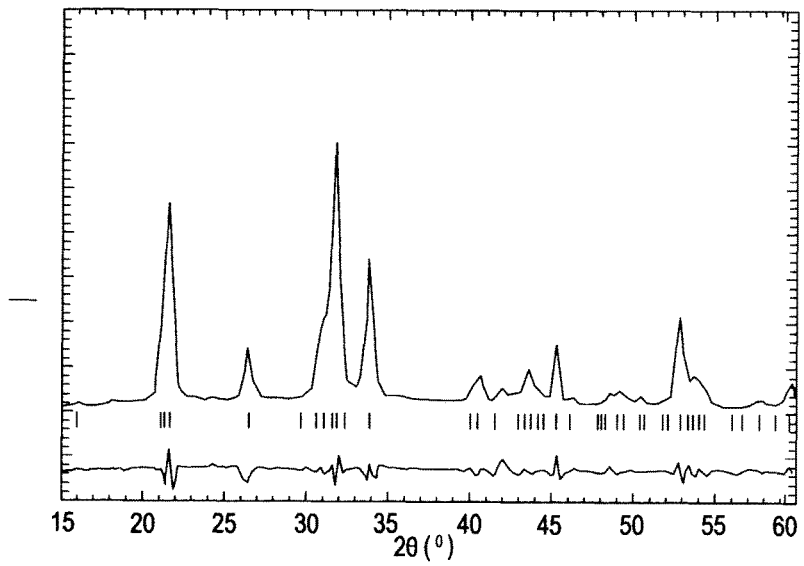

FIG. 9 shows the X-ray diffractogram of the compound LiTiPO$_4$F obtained according to the reaction scheme TiF$_3$+Li$_3$PO$_4 \rightarrow$LiTiPO$_4$F+2LiF. It shows that said compound is a single triclinic phase of space group P-1(2) whose parameters are: a=5.24979 Å, b=5.31177 Å, c=7.43029 Å; α=68.07435°, β=68.01394°, γ=83.37559° V=178.161 Å$^3$.

The compound is in the form of nanometric particles.

EXAMPLE 12

The performance qualities of the compounds obtained via the process described in Examples 5 and 6 were evaluated.

Each of the materials was used as cathode material, on the one hand, in a "lithium" electrochemical cell, and, on the other hand, in a "sodium" electrochemical cell. Cycling was performed at a regime of C/15, in which an electron is exchanged in 15 hours.

The "lithium" cell comprises:
an anode formed from a sheet of lithium metal;
an electrolyte formed from a 1M solution of LiPF$_6$ in a 1/1 by mass mixture of ethyl carbonate and dimethyl carbonate.

The "sodium" cell comprises:
an anode formed by sodium metal applied to a steel disk;
an electrolyte formed by a 1M solution of NaClO$_4$ in propylene carbonate.

FIGS. 10*a* and 10*b* concern the "lithium" cells, and FIGS. 11*a* and 11*b* concern the "sodium" cells. The figures a concern the material of the invention according to Example 5, and the figures b concern the material according to the invention of Example 6.

In each of the figures, the variation of the potential P (in V) is given as a function of the content x of alkali metal over the first two cycles (for the compound (Li,Na)$_x$FePO$_4$F in FIG. 10, for the compound Na$_x$FePO$_4$F in FIG. 11). The insert represents the change in capacitance C (in mAh/g) as a function of the cycling regime R.

EXAMPLE 13

Preparation of LiFeSO$_4$F

Synthesis

In a preliminary step, FeSO$_4$.7H$_2$O was subjected to heat treatment in EMI-TFSI at 250° C. for 10 hours, and then at 280° C. for 24 hours. The monohydrate FeSO$_4$.H$_2$O formed is recovered by centrifugation, washed with ethyl acetate and then dried under vacuum at 100° C.

0.85 g of FeSO$_4$.H$_2$O thus obtained and 0.148 g of LiF (1/1.14 mole ratio) were mixed together in a mortar, the mixture was introduced into a Parr® bomb and 5 ml of ethylmethylimidazolium bis(trifluoromethanesulfonyl) imide (EMI-TFSI) were added. The mixture was stirred for 20 minutes at room temperature. The phases were allowed to settle for 2 hours, and the mixture was then heated at 300° C. for two hours, in the open bomb, without stirring.

After cooling the reaction mixture to room temperature, the powder obtained was separated out by centrifugation, washed 3 times with 20 ml of dichloromethane and then dried in an oven at 60° C.

The product obtained is in the form of a pale green powder. It was subjected to various analyses.

SEM Analysis

FIG. 12 shows the image obtained by SEM and shows that the powder is in the form of aggregates formed from micrometric particles.

TEM Analysis

FIG. 13a shows the TEM image, more particularly the corresponding SAED diagram, and shows that the particles are formed from numerous crystallites. FIG. 13b shows the EDS spectrum, which shows the presence of F. The intensity is given on the y-axis (in arbitrary units) as a function of the energy E keV) on the x-axis.

X-Ray Diffraction

FIG. 14 shows the X-ray diffraction diagram, and, in the form of an insert, the structure of the compound obtained. This structure comprises independent $FeO_4F_2$ octahedra, $SO_4$ tetrahedra with tunnels in which are located the $Li^+$ ions, Thermogravimetric Analysis (TGA)

FIG. 15 shows the diagram obtained during characterization of the compound by TGA coupled with mass spectrometry. The top curve (which bears the values −1.14%, 0.07%, etc.) corresponds to the TGA analysis, the middle curve (which bears the values 458.5° C. and 507.4° C.) corresponds to the differential scanning calorimetry (DSC), and the bottom curve (bearing the references m48 and m64) corresponds to the mass spectrometry. These curves show that a 23.41% loss of weight takes place between 400° C. and 700° C., corresponding to a loss of $SO_2$, which, under electron impact in the mass spectrometers, becomes partially fragmented to SO. The undulations in the TGA and DSC curve for temperatures above 350° C. indicate the start of thermal instability of the compound.

The DSC and TGA analyses thus show that it is not possible to obtain $LiFeSO_4F$ via a ceramic-route process performed at temperatures above 400° C. as described in US-2005/0163699.

To confirm this fact, a sample of the product obtained in the present example was heated in air for 30 minutes as in US 2005/0163699, FIG. 16 shows the change in the X-ray diffraction diagram during the temperature increase. The lines that are visible at 500° C. are attributed to the compounds existing at this temperature, with reference to the JCPDS file numbers corresponding to the identified materials, as follows:

* $Fe_2O_3$ (79-1741)
| $Fe_2O_3$ (25-1402)
❈ $Li_2SO_4$ (32-064)+$FeF_3.3H_2O$ (32-0464)
• $LiHSO_4$ (31-0721)

COMPARATIVE EXAMPLE 14

An equimolar mixture of anhydrous $FeSO_4$ and of LiF was prepared and heated in air at 450° C. for 15 minutes.

FIG. 17 shows the X-ray diffraction diagram for the starting reagent mixture (FIG. 17a) and for the product obtained after the heat treatment (FIG. 17b). The peaks corresponding, respectively, to $FeSO_4$ and to LiF are visible in FIG. 17a, whereas FIG. 17b shows peaks corresponding, respectively, to LiF, $Li_2SO_4$, $Fe_2O_3$ and $Li_2S_2O_7$.

This example confirms that the ceramic-route treatment of a precursor mixture of Fe and of S, and of a precursor of F does not give the compound $LiFeSO_4F$, contrary to what is asserted in US 2005/0163699.

EXAMPLE 15

Synthesis of $LiFeSO_4F$ from $FeSO_4.7H_2O$ and LiF in EMI-TFSI

A mixture of 1.404 g of $FeSO_4.7H_2O$ and 0.149 g of LiF prepared in a mortar was placed in a PTFE flask containing 3 ml of 1-ethyl-3-methylimidazolium bis(trifluoromethanesulfonyl)imide (EMI-TFSI), the mixture was subjected to magnetic stiffing for 20 minutes at room temperature, the stiffing was stopped, 2 ml of ionic liquid (EMI-TFSI) were then added, and the mixture was maintained at room temperature for 30 minutes without stirring. The whole was then placed in an oven at 200° C., the oven temperature was increased by 10° C. every 20 minutes up to 275° C., maintained at this value for 12 hours and then allowed to cool slowly.

The powder formed during the heat treatment was separated from the ionic liquid by centrifugation, washed three times with 10 ml of dichloromethane and then dried in an oven at 60° C.

The refinement of the X-ray diffraction spectrum performed with a copper cathode (shown in FIG. 18) shows the presence of two phases $LiFeSO_4F$ and $FeSO_4.H_2O$ in equivalent proportions.

Phase 1: $LiFeSO_4F$
Triclinic, space group: P-1 (2)
A=5.1819(5) Å, b=5.4853(4) Å, c=7.2297(4) Å,
α=106.4564(3)°, β=107.134(6)°, γ=97.922(5)°
V=182.761(4) Å$^3$.

Phase 2: $FeSO_4.H_2O$
Triclinic, space group: P-1(2)
A=5.178(7) Å, b=5.176(7) Å, c=7.599(7) Å;
α=107.58(6)°, β=107.58(8)°, γ=93.34(6)°
V=182.56(4) Å$^3$.

This example shows that the use of iron sulfate heptahydrate does not make it possible to obtain a triclinic monophase compound.

EXAMPLE 16

Synthesis of $LiFeSO_4F$ starting with $FeSO_4.H_2O$ and LiF in EMI-TFSI

A mixture of 0.85 g of $FeSO_4.H_2O$ and 0.149 g of LiF (1/1.14 mole ratio) prepared in a mortar was introduced into a PTFE flask containing 3 ml of 1-ethyl-3-methylimidazolium bis(trifluoromethanesulfonyl)imide (EMI-TFSI), the mixture was subjected to magnetic stirring for 20 minutes at room temperature, the stirring was stopped, 2 ml of ionic liquid (EMI-TFSI) were then added, and the mixture was maintained at room temperature for 30 minutes without stirring. The whole was then introduced into an oven at 200° C., and the oven temperature was increased by 10° C. every 20 minutes up to 275° C., maintained at this value for 12 hours and then allowed to cool slowly.

The powder formed during the heat treatment was separated from the ionic liquid by centrifugation, washed 3 times with 10 ml of dichloromethane and then dried in an oven at 60° C.

The refinement of the X-ray diffraction spectrum produced with a copper cathode (shown in FIG. 19) shows the presence of a single $LiFeSO_4F$ phase, the lattice parameters of which are as follows:

Triclinic, space group: P-1 (2)
a=5.1827(7) Å, b=5.4946(6) Å, c=7.2285(7) Å,
α=106.535(7)°, β=107.187(6)°, γ=97.876(5)°
V=182.95(4) Å$^3$.

EXAMPLE 17

Synthesis of LiFeSO$_4$F Starting with FeSO$_4$.H$_2$O and LiF

A mixture of 0.85 g of FeSO$_4$.H$_2$O and 0.149 g of LiF (1/1.14 mole ratio) prepared in a mortar was placed in an autoclave containing 3 ml of 1-ethyl-3-methylimidazolium bis(trifluoromethanesulfonyl)imide (EMI-TFSI), the mixture was subjected to magnetic stirring for 30 minutes at room temperature, the stirring was stopped, 2 ml of ionic liquid (EMI-TFSI) were then added and the mixture was maintained at room temperature for 30 minutes without stirring. After closing the autoclave under argon, the whole was placed in an oven at 200° C., and the temperature of the oven was increased by 10° C. every 20 minutes up to 280° C., maintained at this value for 48 hours and then allowed to cool slowly.

The powder formed during the heat treatment was separated from the ionic liquid by centrifugation, washed 3 times with 10 ml of dichloromethane and then dried in an oven at 60° C.

The product obtained is in the form of a whitish powder. The color slightly different than that of the sample of Example 1 denotes a tendency towards non-stoichiometry of the phases, according to the operating conditions.

The refinement of the X-ray diffraction spectrum produced with a copper cathode (shown in FIG. 20) shows the presence of a single LiFeSO$_4$F phase, the lattice parameters of which are as follows:
Triclinic, space group: P-1 (2)
a=5.1782(4) Å, b=5.4972(4) Å, c=7.2252(4) Å,
α=106.537(4)°, β=107.221(4)°, γ=97.788(3)°
V=182.82(4) Å$^3$.

EXAMPLE 18

Synthesis of LiFeSO$_4$F Starting with FeSO$_4$.H$_2$O and LiF in 1-butyl-3-methylimidazolium trifluoromethanesulfonate (triflate)

A mixture of 0.85 g of FeSO$_4$.H$_2$O and 0.149 g of LiF (1/1.14 mole ratio) prepared in a mortar was introduced into an autoclave containing 3 ml of 1-butyl-3-methylimidazolium trifluoromethanesulfonate (triflate), the mixture was subjected to magnetic stirring for 30 minutes at room temperature, the stirring was stopped, 2 ml of ionic liquid EMI-Tf were then added and the mixture was maintained at room temperature for 30 minutes without stirring. After closing the autoclave under argon, the whole was placed in an oven at 200° C., and the temperature of the oven was increased by 10° C. every 20 minutes up to 270° C., maintained at this value for 48 hours and then allowed to cool slowly.

The powder formed during the heat treatment was separated from the ionic liquid by centrifugation, washed 3 times with 10 ml of dichloromethane and then dried in an oven at 60° C.

The refinement of the X-ray diffraction spectrum produced with a cobalt cathode (shown in FIG. 21) shows the presence of an LiFeSO$_4$F phase (representing about 50% by mass) and two "anhydrous FeSO$_4$" phases.

Phase 1: LiFeSO$_4$F, triclinic, space group: P-1(2)
Phase 2: orthorhombic, space group Cmcm (63)
Phase 3: orthorhombic, space group Pbnm (62)

Comparison of this example with the preceding example shows that the use of a hydrophobic ionic liquid (EMI-TFSI) makes it possible to obtain a monophase LiFeSO$_4$F compound, whereas the hydrophilic ionic liquid used in the present example dehydrates the FeSO$_4$.H$_2$O before the reaction. The result is a partial reaction, and as such the final product is a mixture.

EXAMPLE 19

Synthesis of LiCoSO$_4$F Starting with CoSO$_4$.H$_2$O and LiF in EMI-TFSI

The precursor CoSO$_4$.H$_2$O used was prepared from CoSO$_4$.7H$_2$O by heating under vacuum at 160° C. for 2 hours.

A mixture of 0.86 g of CoSO$_4$.H$_2$O and 0.149 g of LiF (1/1.13 mole ratio) prepared in a mortar was placed in a PTFE flask containing 5 and of 1-ethyl-3-methylimidazolium bis(trifluoromethanesulfonyl)imide (EMI-TFSI), the mixture was subjected to magnetic stirring for 20 minutes at room temperature, and the stirring was stopped. The flask was then closed under argon, and the reaction mixture was maintained at room temperature for 30 minutes without stirring. The whole was then introduced into an oven at 250° C., the temperature of the oven was increased by 5° C. every 10 minutes up to 275° C., maintained at this value for 36 hours and then allowed to cool slowly.

The powder formed during the heat treatment was separated from the ionic liquid by centrifugation, washed 3 times with 10 ml of ethyl acetate, and then dried in an oven at 60° C.

The refinement of the X-ray diffraction spectrum produced with a cobalt cathode (shown in FIG. 22) shows the presence of a single phase of triclinic lattice (P-1) LiCoSO$_4$F, whose lattice parameters are as follows:
a=5.1719(6) Å, b=5.4192(6) Å, c=7.1818(7) Å,
α=106.811(7)°, β=107.771(7)°, γ=97.975 (5)°
V=177.71(3) Å$^3$.

The curve obtained by thermogravimetric analysis is shown in FIG. 23. It shows a loss of weight at and above 400° C., which is proof that the compound LiCoSO$_4$F is decomposed. It therefore cannot be obtained via a solid-phase process using higher temperatures.

To confirm this fact, a sample of the product obtained in the present example was heated in air for 30 minutes as in US 2005/0163699. FIG. 24 shows the change in the X-ray diffraction diagram during the temperature increase. The arrows denote the zones in which the peaks corresponding to decomposition products are present. It thus appears that the compound begins to decompose at 375° C. The abbreviation "RT" given to the right of the bottom curve means "room temperature".

EXAMPLE 20

Synthesis of LiNiSO$_4$F Starting with NiSO$_4$.H$_2$O and LiF in EMI-TFSI

The monohydrate NiSO$_4$.H$_2$O used as precursor was prepared from NiSO$_4$.7H$_2$O by heating under vacuum at 240° C. for 2 hours.

A mixture of 0.86 g of NiSO$_4$.H$_2$O and 0.149 g of LiF (1/1.13 mole ratio) prepared in a mortar was placed in a PTFE flask containing 5 ml of 1-ethyl-3-methylimidazolium bis(trifluoromethanesulfonyl)imide (EMI-TFSI), the mixture was subjected to magnetic stirring for 20 minutes at room temperature, and the stirring was stopped. The flask was then closed under argon and the reaction mixture was maintained at room temperature for 30 minutes without stirring. The whole was then placed in an oven at 250° C., and the temperature of the oven was increased up to 285° C. over 2 hours, maintained at this value for 36 hours, and then allowed to cool slowly.

The powder formed during the heat treatment was separated from the ionic liquid by centrifugation, washed 3 times with 10 ml of ethyl acetate and then dried in an over at 60° C.

The X-ray diffraction diagram produced with a cobalt cathode (shown in FIG. 25) shows that the compound obtained contains more than 90.95% of a phase similar to that of $LiFeSO_4F$ or $LiCoSO_4F$. The lattice parameters of this phase are as follows:
Triclinic, space group: P-1 (2)
a=5.173(1) Å, b=5.4209(5) Å, c=7.183(1) Å,
α=106.828(9)°, β=107.776(8)°, γ=97.923 (8)°
V=177.85(5) Å$^3$.

The curve obtained by thermogravimetric analysis is shown in FIG. 26. It shows a weight loss at and above 380° C., which is proof that the compound $LiNiSO_4F$ has decomposed. It therefore cannot be obtained via a solid-phase process using higher temperatures.

To confirm this fact, a sample of the product obtained in the present example was heated in air for 30 minutes as in US 2005/0163699, FIG. 27 shows the change in the X-ray diffraction diagram during the temperature increase. The arrows denote the areas in which the peaks corresponding to decomposition products are present. It thus appears that the compound begins to decompose at 375° C. The abbreviation "RT" given to the right of the bottom curve means "room temperature".

EXAMPLE 21

Solid Solution of $LiFe_{1-y}Mn_ySO_4F$

A compound $LiFe_{1-y}Mn_ySO_4F$ was prepared from LiF and from a solid solution $Fe_{1-y}Mn_ySO_4 \cdot H_2O$ as precursor.
Preparation of the Precursor 1-y mol of $FeSO_4 \cdot 7H_2O$ and y mol of $MnSO_4 \cdot H_2O$ were dissolved in 2 ml of water degassed beforehand with argon to avoid oxidation of the Fe(II), followed by addition of 20 ml of ethanol. The powder formed by precipitation during the addition of the ethanol was recovered by centrifugation, washed twice with 20 ml of ethanol and then heated at 200° C. under vacuum for 1 hour.

Several samples were prepared, by varying the value of y.

The samples were analyzed by X-ray diffraction. The diffractogram of the sample "y=0.5" obtained is shown in FIG. 28. It shows that it is a solid solution $Fe_{0.5}Mn_{0.5}SO_4 \cdot H_2O$ whose lattice parameters are as follows:
Triclinic; space group: P-1 (2)
a=5.2069 Å, b=5.2056 Å, c=7.6725 Å,
α=107.7196°, β=107.4498°, γ=93.08°
V=1186.56 Å$^3$.
Preparation of the Solid Solution $LiFe_{1-y}Mn_ySO_4F$ The synthesis was performed via the ionothermal route in an autoclave at 270° C., for various samples of precursors.

A mixture of 0.85 g of $Fe_{0.5}Mn_{0.5}SO_4 \cdot H_2O$ and 0.149 g of LiF (1/1.14 mole ratio) prepared in a mortar was placed in an autoclave containing 3 ml of 1-ethyl-3-methylimidazolium bis(trifluoromethanesulfonyl)imide (EMI-TFSI), the mixture was subjected to magnetic stirring for 20 minutes at room temperature, the stirring was stopped, 2 ml of ionic liquid (EMI-TFSI) were then added and the mixture was maintained at room temperature for 30 minutes without stirring. After closing the autoclave under argon, the whole was placed in an oven at 200° C., and the temperature of the oven was increased by 10° C. every 20 minutes up to 270° C., maintained at this value for 48 hours and then allowed to cool slowly.

The powder formed during the heat treatment was separated from the ionic liquid by centrifugation, washed 3 times with 10 ml of dichloromethane and then dried in an oven at 60° C.

The X-ray diffraction shows the formation of the solid solution $LiFe_{1-y}Mn_ySO_4F$ at low values of y (especially for y<0.1) and the formation of mixed phases for higher values of y (especially for y>0.25).

EXAMPLE 22

Preparation of $FeSO_4F$

The compound is prepared by chemical delithiation with $NO_2OF_4$ in acetonitrile at room temperature. The X-ray diffraction spectrum shown in FIG. 29 shows that the compound crystallizes in a lattice whose parameters are:
triclinic, space group: P-1 (2)
A=5.0682 Å, b=5.0649 Å, c=7.255 Å
α69.36°, β=68.80°, γ=88.16°
V=161.52Å$^3$.

EXAMPLE 23

Electrochemical Tests

Samples of compound $LiFeSO_4F$, prepared according to Example 16, were tested as positive electrode material in a Swagelok cell in which the electrode is a lithium foil, the two electrodes being separated by a polypropylene separator soaked with a 1M solution of $LiPF_6$ in a 1/1 ethylene carbonate/dimethyl carbonate EC-DMC mixture. To produce a positive electrode, 80 mg of $LiFeSO_4F$ (in the form of particles with a mean diameter of 1 μm) and 20 mg of carbon were mixed together by mechanical grinding in a SPEX 1800 mill for 15 minutes. An amount of mixture corresponding to 8 mg of $LiFeSO_4F$ per cm$^2$ was applied to an aluminum current collector.

In FIG. 30, the main curve shows the variation in potential as a function of the degree of insertion of lithium, during the cell cycling at a regime of C/10, and the insert shows the change in capacitance of a cell during the succession of cycles at a regime of C/10, N being the number of cycles.

FIG. 31 shows the variation in potential as a function of the degree of insertion of lithium, during cell cycling at a regime of C/2.

FIG. 32 shows the variation in capacitance of a cell as a function of the cycling regime R.

It is thus seen that the capacitance remains at 90% at a regime of 0.5 C, and at 67% at a regime of C/10.

The invention claimed is:
1. A process for preparing an inorganic oxide of formula (I) $A_aM_m(YO_4)_yZ_z$ (I) in which:
  A represents at least one element chosen from alkali metals, alkaline-earth metals, a dopant element and a space;

M represents $(T_{1-t}T'_t)$, T representing one or more transition metals and T' representing at least one element chosen from Mg, Ca, Al and rare-earths, $0 \le t<1$;

Y represents at least one element chosen from S, Se, P, As, Si, Ge and Al;

Z represents at least one element chosen from F, O and OH;

a, m, y and z are stoichiometric coefficients and are real, zero or positive numbers, with the following conditions:

a, m, t, y and z are such that the electrical neutrality of the inorganic oxide of formula (I) is respected, $a \ge 0$; $m>0$; $y>0$ $z \ge 0$;

starting with precursors of the constituent elements of the inorganic oxide of formula (I), said process comprises the following steps:
  i) dispersion of said precursors in a support liquid consisting essentially of one or more ionic liquids formed from a cation and an anion whose electrical charges equilibrate, to obtain a suspension of said precursors in said liquid, said precursors having no solubility in said liquid support
  ii) heating of said suspension to a temperature from 25 to 380° C.,
  iii) separation of said ionic liquid and of the inorganic oxide of formula (I) derived from the reaction between said precursors.

2. The process as claimed in claim 1, wherein the precursors of an alkali metal A are selected from the group consisting of the salts of thermolabile anions; the salts of volatile organic acids; and the salts of acids that can decompose when hot.

3. The process as claimed in claim 2, wherein said precursors are selected fro the group consisting of $Li_2CO_3$, $LiHCO_3$, $LiOH$, $Li_2O_2$, $LiNO_3$, $LiCH_3CO_2$, $LiCHO_2$, $Li_2C_2O_4$, $Li_3C_6H_5O_7$, $Na_2CO_3$, $NaOH$, $Na_2O_2$, $NaNO_3$, $NaCH_3CO_2$, $NaCHO_2$, $Na_2C_2O_4$, $Na_3C_6H_5O_7$, $K_2CO_3$, $KOH$, $K_2O_2$, $KO_2$ $KNO_3$, $KCH_3CO_2$, $KCHO_2$, $K_2C_2O_4$, $K_3C_6H_5O_7$ and hydrates thereof.

4. The process as claimed in claim 1, wherein the precursors of a transition metal M are selected from the group consisting of the salts of volatile inorganic acids, the salts of volatile organic acids, the salts of acids that can decompose when hot, and the salts of inorganic acids.

5. The process as claimed in claim , wherein the precursors of the oxyanions $YO_4$ are chosen from the corresponding acids thermolabile ammonium, amine, imidazole or pyridine salts.

6. The process as claimed claim 1, wherein the oxyanion $YO_4$ precursors are selected from the group consisting of $AHSO_4$ and $A_2SO_4$, in which A represents an alkali metal.

7. The process as claimed in claim 6, wherein the oxyanion $YO_4$ precursors are selected from the group consisting of $LiHSO_4$ and $Li_2SO_4$.

8. The process as claimed in claim 1, wherein the amount of precursors present in the ionic liquid during step i) is from 0.01% to 85% by mass.

9. The process as claimed in claim 1, wherein the oxides of formula (I) are selected from the group consisting of the fluorosulfates $A_aM_mSO_4F$ and sulfates.

10. The process as claimed in claim 1, wherein the cations of the ionic liquid are selected from the group consisting of the cations of the following formulae:

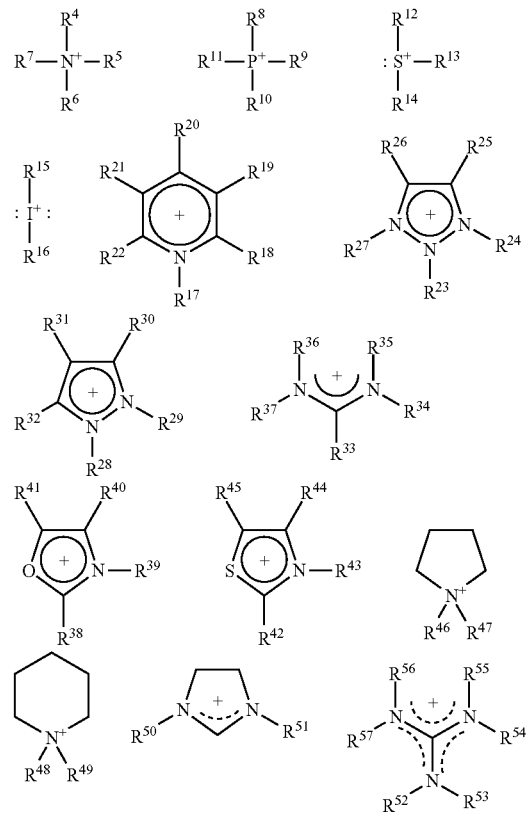

in which:
the radicals $R^4$-$R^{17}$, $R^{27}$, $R^{24}$, $R^{28}$, $R^{29}$, $R^{37}$, $R^{34}$, $R^{39}$, $R^{43}$ and $R^{46}$ to $R^{57}$, independently of each other, represent a $C_1$-$C_{24}$ alkyl, $C_1$-$C_{24}$ arylalkyl or $(C_1$-$C_{24})$ alkylaryl radical;

the radicals $R^{18}$ to $R^{22}$, $R^{23}$, $R^{25}$,$R^{26}$,$R^{30}$ to $R^{33}$, $R^{35}$, $R^{36}$, $R^{38}$, $R^{40}$ to $R^{42}$, $R^{44}$, and $R^{45}$ represent a hydrogen atom, a $C_1$-$C_{24}$ alkyl radical, an aryl radical, a $C_1$-$C_{24}$ oxaalkyl radical or a radical $[(CH)_2]_mQ$ in which Q represents OH, CN, C(=O)OR$^{58}$, C(=O)NR$^{59}$R$_{60}$, NR$^{61}$R$^{62}$ or a 1-imidazoyl, 3-imidazoyl or 4-imidazoyl radical and m is a positive integer between 0 and 12 inclusive;

the radicals $R^8$ to $R^{16}$ may also denote a ($C_1$-$C_{20}$)alkylaryl radical or a group NR$^{63}$R$^{64}$, $R^{58}$ to $R^{64}$, independently of each other, represent a hydrogen atom or a $C_1$ -$C_{20}$ alkyl, aryl or $C_1$-$C_{20}$ oxaalkyl radical.

11. The process as claimed in claim 1, wherein the anions of the ionic liquids are selected from the group consisting of: Cl, Br, I, $RSO_3^{31}$, $ROSO_3^-$, $[RPO_2]^-$, $[R(R'O)PO_2]^-$, $[(RO)_2 PO_2]^-$, $BF_4^-$, $R_fBF_3^-$, $PF_6^-$, $R_fPF_5^-$, $(R_f)_2PF_4^-$, $(R_f)_3PF_3^-$, $R_fCO_2^-$, $R_fSO_3^-$, $[(R_fSO_2)_2N]^-$, $[(R_fSO_2)_2CH]^-$, $[(R_fSO_2)_2C(CN)]^-$, $[R_fSO_2C(CN)_2]^-$, $[(R_fSO_2)_3C]^{31}$, $N(CN)_2^-$, $C(CN)_3^-$, $[(C_2O_4)_2B]^-$ in which:

R and R', which may be identical or different, represent a $C_1$-$C_{24}$ alkyl, aryl or $(C_1$-$C_{24})$alkylaryl radical, $R_f$ is a fluoro radical chosen from $C_nF_{2n+1}$ in which $0 \le n \le 8$, $CF_3OCF_2$, $HCF_2CF_2$ and $C_6F_5$.

12. The process as claimed in claim 1, wherein the ionic liquid contains one or more carbon precursors chosen from simple carbohydrates and polymerized carbohydrates.

13. The process as claimed in claim 1, wherein the heating step ii) is continued d beyond 380° C.

14. The process as claimed in clan wherein the heating step is performed under an inert atmosphere, at atmospheric pressure.

15. The process as claimed in claim 1, wherein the duration of the heating step ii) ranges from 10 minutes to 200 hours.

16. The process as claimed in claim 2, wherein the precursors of an alkali metal A are selected from the group consisting of carbonates, hydrogen carbonates, hydroxides, peroxides and nitrates; acetates and formates; oxalates, malonates and citrates.

17. The process as claimed in claim 4, wherein the precursors of a transition metal M are selected from the group consisting of nitrates and carbonates, acetates and formates, oxalates, malonates and citrates, and sulfates, chlorides and bromides.

18. The process as claimed in claim 5, wherein the precursors of the oxyanions $YO_4$ are chosen from $H_2SO_4$; thermolabile ammonium, amine, imidazole or pyridine salts.

19. The process as claimed in claim 12, wherein the ionic liquid contains one or more carbon precursors chosen from sugars and starch and cellulose.

\* \* \* \* \*